United States Patent
Zhang et al.

(10) Patent No.: US 11,910,217 B2
(45) Date of Patent: Feb. 20, 2024

(54) DEMODULATION REFERENCE SIGNAL BASED SELF-INTERFERENCE MEASUREMENT

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US); Navid Abedini, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 245 days.

(21) Appl. No.: 17/301,798

(22) Filed: Apr. 14, 2021

(65) Prior Publication Data
US 2021/0352510 A1    Nov. 11, 2021

Related U.S. Application Data

(60) Provisional application No. 63/021,427, filed on May 7, 2020.

(51) Int. Cl.
*H04W 4/00*    (2018.01)
*H04W 24/10*    (2009.01)
(Continued)

(52) U.S. Cl.
CPC .......... *H04W 24/10* (2013.01); *H04L 5/0048* (2013.01); *H04L 5/0055* (2013.01); *H04L 5/14* (2013.01); *H04W 24/08* (2013.01); *H04W 72/23* (2023.01)

(58) Field of Classification Search
None
See application file for complete search history.

(56) References Cited

U.S. PATENT DOCUMENTS 10,903,952 B2 *  1/2021  Noh ...................... H04L 5/0048
11,140,695 B1 * 10/2021  Eyuboglu ........... H04W 72/535
(Continued)

OTHER PUBLICATIONS

Huawei, et al., "Overview of Rel-17 Work Areas for NR and LTE", 3GPP TSG RAN Meeting #84, RP-191486, Overview of Rel-17 Work Areas for NR and LTE Final (WAS RP-191007), 3rd Generation Partnership Project (3GPP), Mobile Competence Centre, 650, Route Des Lucioles, F-06921, Sophia-Antipolis, vol. TSG RAN, No. Newport Beach, USA, Jun. 3-6, 2019, Jun. 4, 2019 (Jun. 4, 2019), 22 Pages, May 29, 2019 (May 29, 2019), XP051748412, Retrieved from the Internet: URL: http://www.3gpp.org/ftp/Meetings%5F3GPP%5FSYNC/RAN/Docs/RP%2D191486%2Ezip [retrieved on Jun. 4, 2019], Section Mobility Enhancements, in Particular p. 13, the Paragraphs Below Figure 3, the whole document, Section "Mobility Enhancements", [retrieved on May 29, 2019] p. 12-p. 13, p. 16-p. 18, p. 16-p. 17.
(Continued)

*Primary Examiner* — Bob A Phunkulh
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may transmit, in a full duplex communication mode, a data transmission or a control transmission; perform a self-interference measurement (SIM) associated with an uplink transmit beam from a first panel and a downlink receive beam from a second panel of the UE, based at least in part on at least part of the data transmission or the control transmission; and transmit a measurement report indicating the SIM. Numerous other aspects are provided.

30 Claims, 12 Drawing Sheets

(51) Int. Cl.
*H04W 24/08* (2009.01)
*H04L 5/00* (2006.01)
*H04L 5/14* (2006.01)
*H04W 72/23* (2023.01)

(56) References Cited

U.S. PATENT DOCUMENTS

| | | | | |
|---|---|---|---|---|
| 11,206,549 | B1* | 12/2021 | Eyuboglu | H04J 11/0079 |
| 11,271,699 | B1* | 3/2022 | Eyuboglu | H04B 7/0691 |
| 11,375,527 | B1* | 6/2022 | Eyuboglu | H04B 7/15528 |
| 2017/0033916 | A1 | 2/2017 | Stirling-Gallacher et al. | |
| 2017/0230159 | A1* | 8/2017 | Noh | H04L 5/0053 |
| 2018/0192371 | A1* | 7/2018 | Jung | H04W 68/02 |
| 2018/0227906 | A1* | 8/2018 | Yang | H04W 74/00 |
| 2019/0260485 | A1 | 8/2019 | Byun et al. | |
| 2019/0335471 | A1* | 10/2019 | Kim | H04L 5/0053 |
| 2020/0008228 | A1* | 1/2020 | Lee | H04L 5/001 |
| 2020/0021419 | A1* | 1/2020 | Taherzadeh Boroujeni | H04L 5/0091 |
| 2020/0053781 | A1* | 2/2020 | Pan | H04W 72/30 |
| 2020/0266908 | A1* | 8/2020 | Qian | H04L 5/0007 |
| 2021/0067307 | A1* | 3/2021 | Kim | H04W 72/23 |
| 2021/0159966 | A1* | 5/2021 | Xi | H04B 7/088 |
| 2021/0185706 | A1* | 6/2021 | Park | H04W 72/12 |
| 2022/0029761 | A1* | 1/2022 | Su | H04L 5/1438 |
| 2022/0094583 | A1* | 3/2022 | Sahin | H04L 27/262 |
| 2022/0095330 | A1* | 3/2022 | Kang | H04W 72/044 |
| 2022/0123815 | A1* | 4/2022 | Karjalainen | H04B 17/309 |
| 2022/0159580 | A1* | 5/2022 | Su | H04W 52/367 |
| 2022/0216976 | A1* | 7/2022 | Zhang | H04B 17/327 |
| 2023/0041222 | A1* | 2/2023 | Dimou | H04W 72/23 |
| 2023/0044109 | A1* | 2/2023 | Xu | H04W 68/02 |
| 2023/0044215 | A1* | 2/2023 | Wang | H04W 72/20 |
| 2023/0132757 | A1* | 5/2023 | Kang | H04W 16/28 370/329 |
| 2023/0291529 | A1* | 9/2023 | Zhang | H04L 5/0051 370/329 |

OTHER PUBLICATIONS

International Search Report and Written Opinion—PCT/US2021/027467—ISA/EPO—dated Sep. 6, 2021.
Partial International Search Report—PCT/US2021/027467—ISA/EPO—dated Jul. 16, 2021.

* cited by examiner

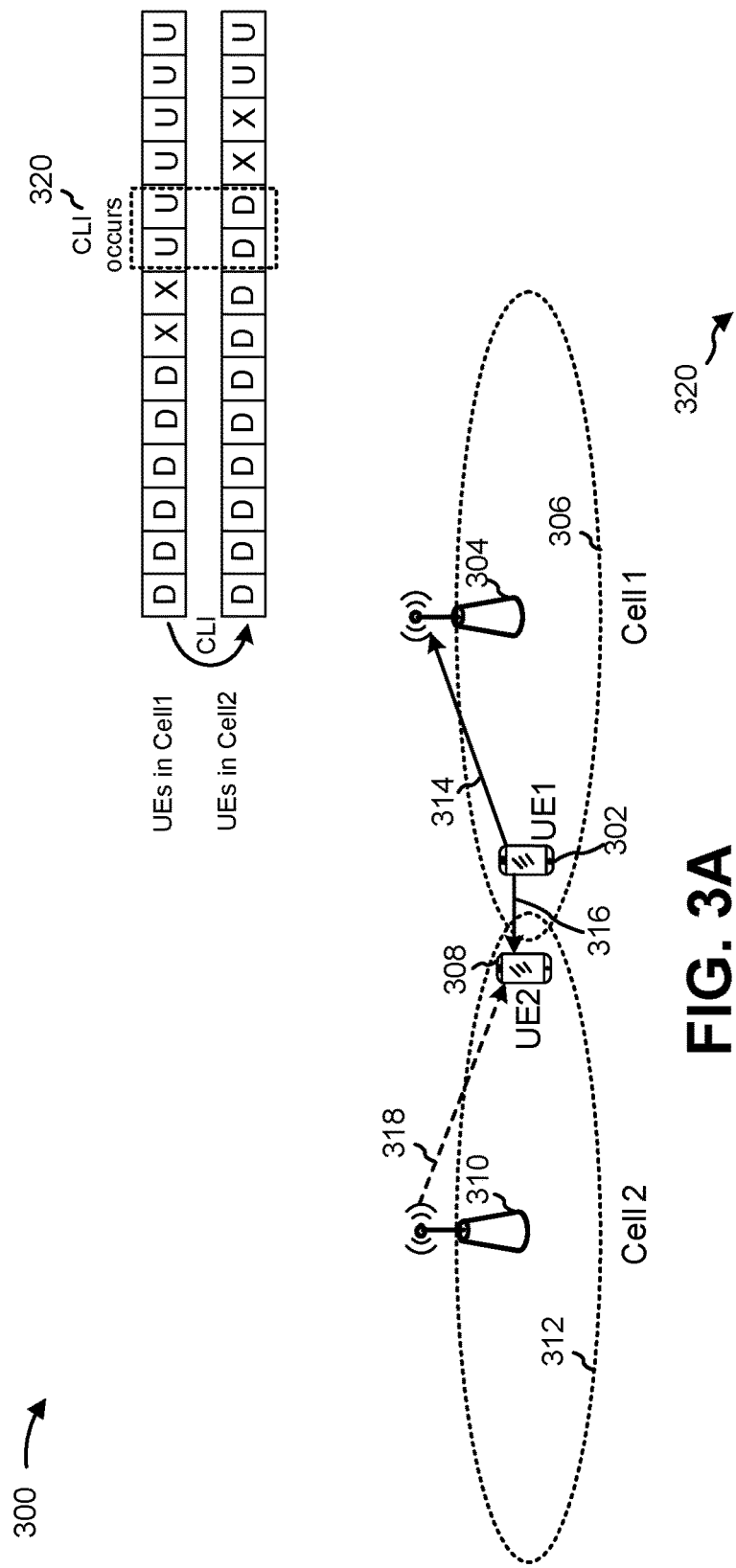
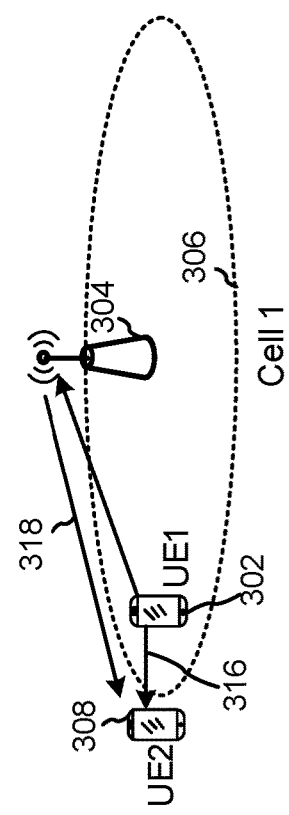
FIG. 3A
FIG. 3B

DEMODULATION REFERENCE SIGNAL BASED SELF-INTERFERENCE MEASUREMENT

CROSS-REFERENCE TO RELATED APPLICATION

This Patent application claims priority to U.S. Provisional Patent Application No. 63/021,427, filed on May 7, 2020, entitled "DEMODULATION REFERENCE SIGNAL BASED SELF-INTERFERENCE MEASUREMENT," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for demodulation reference signal (DMRS) based self-interference measurement (SIM).

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment, may include transmitting, in a full duplex communication mode, a data transmission or a control transmission; performing a self-interference measurement (SIM) associated with an uplink (UL) transmit (Tx) beam from a first panel and a downlink (DL) receive (Rx) beam from a second panel of the UE, based at least in part on at least part of the data transmission or the control transmission; and transmitting a measurement report indicating the SIM.

In some aspects, a method of wireless communication, performed by a base station, may include receiving, from a UE in a full duplex communication mode, a data transmission or a control transmission; receiving, from the UE, a measurement report indicating a SIM associated with a UL Tx beam from a first panel and a DL Rx beam from a second panel of the UE, wherein the SIM is based at least in part on at least part of the data transmission or the control transmission; and determining a selected beam pair based at least in part on the measurement report.

In some aspects, a user equipment for wireless communication may include a memory and one or more processors coupled to the memory. The memory and the one or more processors may be configured to transmit, in a full duplex communication mode, a data transmission or a control transmission; perform a SIM associated with a UL Tx beam from a first panel and a DL Rx beam from a second panel of the UE, based at least in part on at least part of the data transmission or the control transmission; and transmit a measurement report indicating the SIM.

In some aspects, a base station for wireless communication may include a memory and one or more processors coupled to the memory. The memory and the one or more processors may be configured to receive, from a UE in a full duplex communication mode, a data transmission or a control transmission; receive, from the UE, a measurement report indicating a SIM associated with a UL Tx beam from a first panel and a DL Rx beam from a second panel of the UE, wherein the SIM is based at least in part on at least part of the data transmission or the control transmission; and communicate using a selected beam pair based at least in part on the measurement report.

In some aspects, a non-transitory computer-readable medium may store one or more instructions for wireless communication. The one or more instructions, when executed by one or more processors of a UE, may cause the one or more processors to transmit, in a full duplex communication mode, a data transmission or a control transmission; perform a SIM associated with a UL Tx beam from a first panel and a DL Rx beam from a second panel of the UE, based at least in part on at least part of the data transmission or the control transmission; and transmit a measurement report indicating the SIM.

In some aspects, a non-transitory computer-readable medium may store one or more instructions for wireless communication. The one or more instructions, when executed by one or more processors of a base station, may cause the one or more processors to receive, from a UE in a full duplex communication mode, a data transmission or a control transmission; receive, from the UE, a measurement report indicating a SIM associated with a UL Tx beam from a first panel and a DL Rx beam from a second panel of the UE, wherein the SIM is based at least in part on at least part of the data transmission or the control transmission; and communicate using a selected beam pair based at least in part on the measurement report.

In some aspects, an apparatus for wireless communication may include means for transmitting, in a full duplex communication mode, a data transmission or a control transmission; means for performing a SIM associated with a UL Tx beam from a first panel and a DL Rx beam from a second panel of the apparatus, based at least in part on at least part of the data transmission or the control transmission; and means for transmitting a measurement report indicating the SIM.

In some aspects, an apparatus for wireless communication may include means for receiving, from a UE in a full duplex communication mode, a data transmission or a control transmission; means for receiving, from the UE, a measurement report indicating a SIM associated with a UL Tx beam from a first panel and a DL Rx beam from a second panel of the UE, wherein the SIM is based at least in part on at least part of the data transmission or the control transmission; and means for determining a selected beam pair based at least in part on the measurement report.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 3A is a diagram illustrating a wireless network operating in a semi-static time division duplexing (TDD) configuration.

FIG. 3B is a diagram illustrating a wireless network operating in a dynamic TDD configuration.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
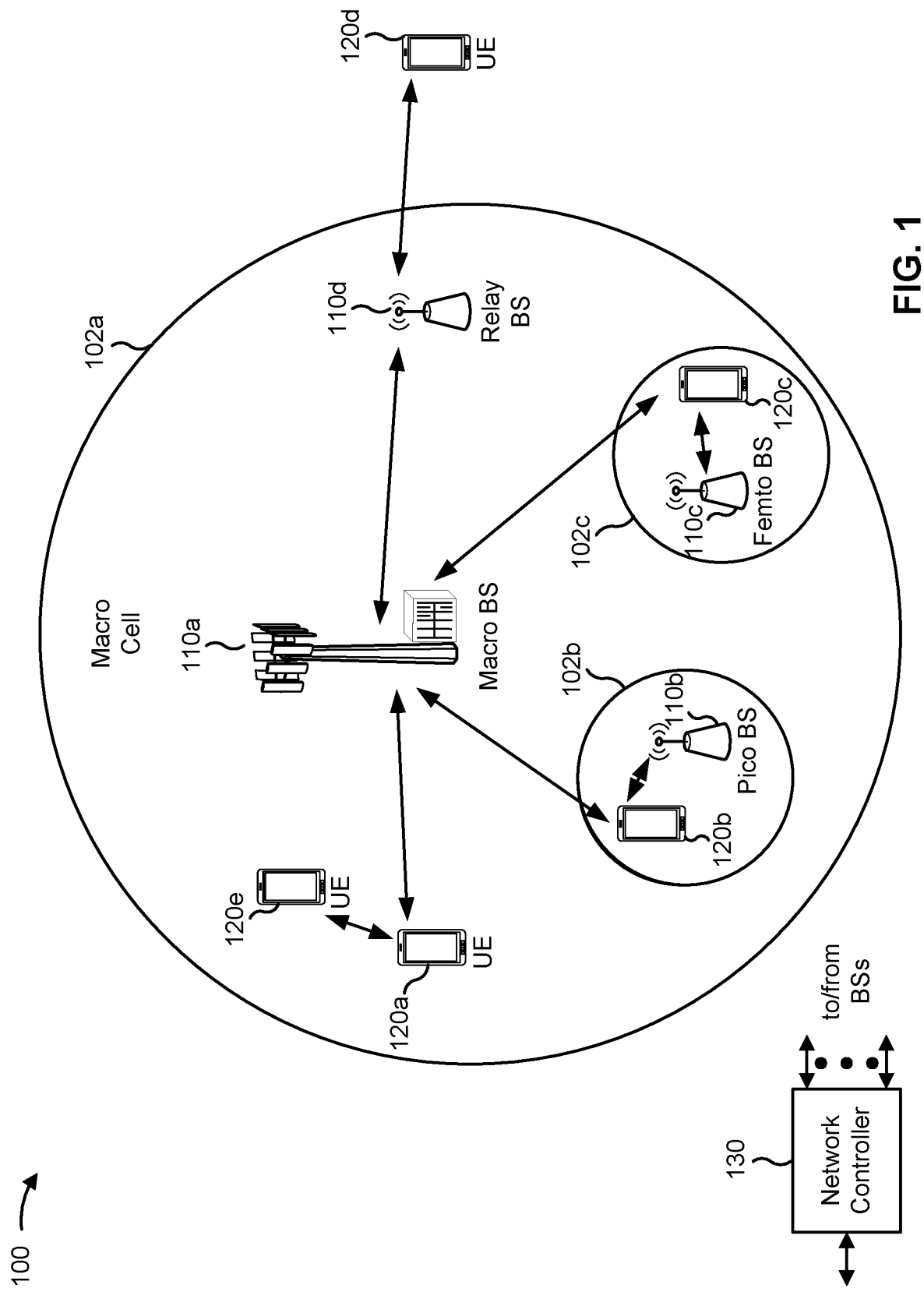
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peerto-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based at least in part on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
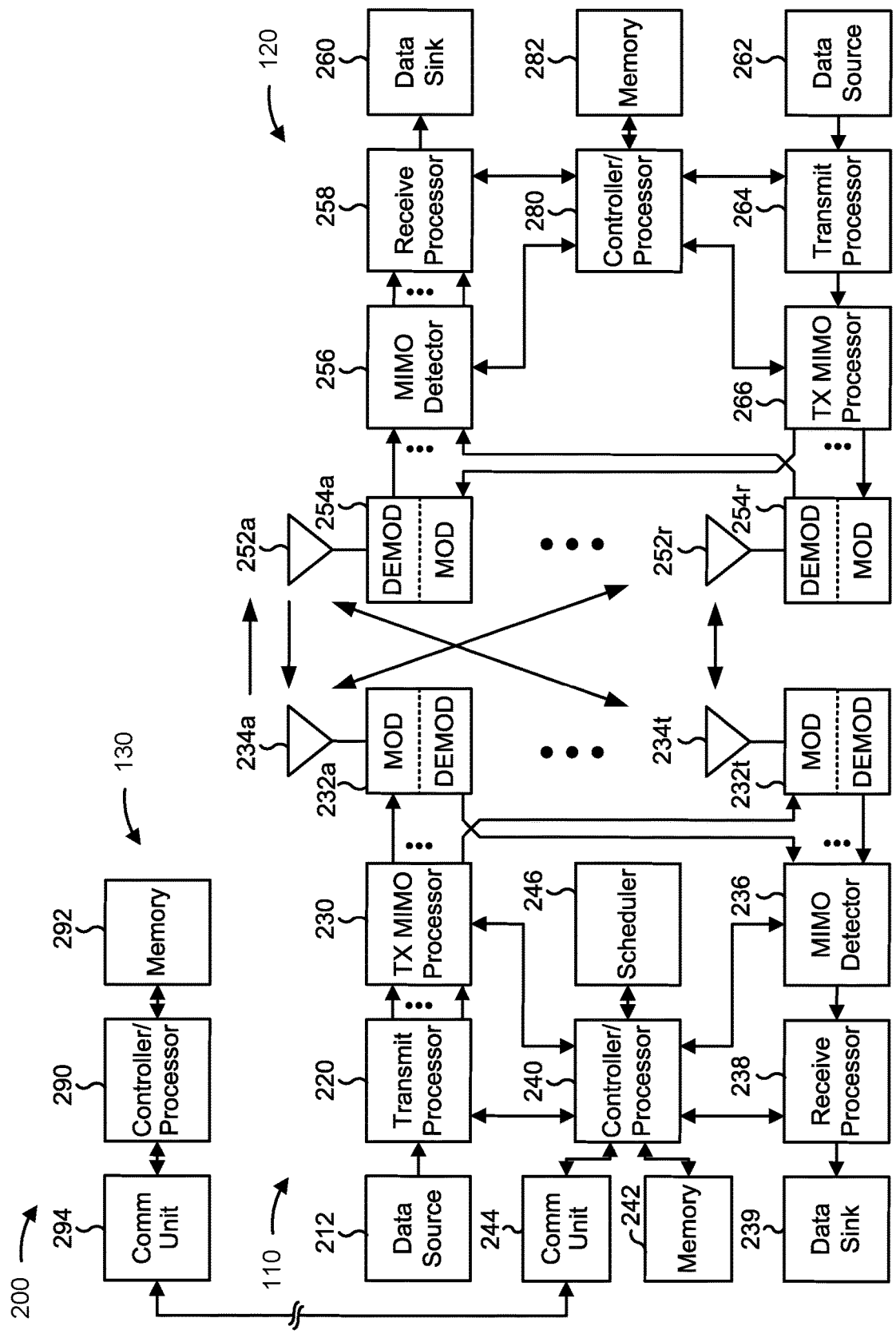
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a channel quality indicator (CQI) parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-12).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-12).

Controller/processor 240 of base station 110, controller/processor 280 of UE 120, and/or any other component(s) of FIG. 2 may perform one or more techniques associated with demodulation reference signal (DMRS) based self-interference measurement (SIM), as described in more detail elsewhere herein. For example, controller/processor 240 of base station 110, controller/processor 280 of UE 120, and/or any other component(s) of FIG. 2 may perform or direct operations of, for example, process 1100 of FIG. 11, process 1200 of FIG. 12, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1100 of FIG. 11, process 1200 of FIG. 12, and/or other processes as described herein. In some aspects, executing instructions may include running the instructions, converting the instructions, compiling the instructions, and/or interpreting the instructions.

In some aspects, UE 120 may include means for transmitting, in a full duplex communication mode, a data transmission or a control transmission, means for performing a SIM associated with an uplink (UL) transmit (Tx) beam from a first panel and a downlink (DL) receive (Rx) beam from a second panel of the UE, based at least in part on at least part of the data transmission or the control transmission, means for transmitting a measurement report indicating the SIM, means for receiving information indicating a quasi-colocation configuration for the DL Rx beam corresponding to the UL Tx beam associated with the SIM, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving, from a UE in a full duplex communication mode, a data transmission or a control transmission, means for receiving, from the UE, a measurement report indicating a SIM associated with an UL Tx beam from a first panel and a DL Rx beam from a second panel of the UE, wherein the SIM is based at least in part on at least part of the data transmission or the control transmission, means for determining a selected beam pair based at least in part on the measurement report, means for transmitting information indicating a quasi-colocation configuration for the DL Rx beam corresponding to the UL Tx beam associated with the SIM, means for transmitting downlink control information that schedules a CM resource corresponding to the DMRS, wherein the CM is performed using the scheduled CM resource, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

FIG. 3A is a diagram illustrating a wireless network 300 operating in a semi-static TDD configuration. FIG. 3B is a diagram illustrating a wireless network 320 operating in dynamic TDD configuration. Dynamic TDD may enhance spectrum efficiency of wireless communication networks and provide a higher throughput by dynamically altering uplink (UL) or downlink (DL) transmission direction. However, if nearby UEs have different TDD UL-DL slot formats, one UE (e.g., UE2 308, which may include UE 120) may be a victim and may receive a UL transmission from another UE (e.g., UE1 302 (which may include UE 120)) known as an aggressor. The received UL transmission from the UE1 302 is known as cross link interference (CLI). CLI occurs when a UL symbol (e.g., an interfering symbol) of an aggressor collides with a DL symbol (e.g., an interfered symbol) of a victim. CLI may be caused by a UL transmission from the aggressor UE (e.g., UE1 302). The configuration of dynamic TDD is able to change dynamically in response to a change of traffic pattern. For example, in instances where the traffic pattern is UL heavy, dynamic TDD may recognize the change in the traffic pattern and adapt by providing more UL symbols to meet the demand. Alternatively, in instances where the traffic pattern is DL heavy, dynamic TDD may provide more DL symbols to meet the demand.

In FIG. 3A, UE1 302 is within Cell1 306 and is being served by base station 304 (e.g., base station 110), while UE2 308 is within Cell2 312 and is being served by base station 310 (e.g., base station 110). CLI may occur between UEs at the cell edges of nearby cells, as UEs at cell edges of nearby cells may be in close proximity to each other. As shown in FIG. 3A, UE1 302 and UE2 308 are at their respective cell edges, and may be communicating with their respective base stations. UE1 302 may send a UL transmission 314 to base station 304, while UE2 308 is receiving a DL transmission 318 from base station 310. However, in certain instances, the UL transmission 314 sent by UE1 302 to base station 304 may also be received by UE2 308 while receiving the DL transmission 318 from base station 310. The UL transmission 314 from UE1 302 received by UE2 308 causes UL CLI 316 and may interfere with the DL transmission 318 of UE2 308 from base station 310. As such, one or more UL symbols of the UL transmission 314 may collide with one or more DL symbols of the DL transmission 318. In the example of FIG. 3A, two UL symbols of the UL transmission 314 overlap or collide with two DL symbols of the DL transmission 318, such that CLI occurs at the overlap 320.

In the example of FIG. 3B, both UE1 302 and UE2 308 are being served by the same cell (e.g., cell 1 306). Both UE1 302 and UE2 308 are near the cell edge, and in some instances, the UL transmission 314 sent by UE1 302 to base station 304 may also be received by UE2 308 while receiving the DL transmission 318 from base station 304. The UL transmission 314 from UE1 302 received by UE2 may cause UL CLI 316 and may interfere with the DL 318 of UE2 308 from the base station 304. As such, one or more UL symbols of the UL transmission 314 may collide with one or more DL symbols of the DL transmission 318.

CLI measurement metrics include sounding reference signal reference signal received power (SRS-RSRP) and CLI-received signal strength indicator (CLI-RSSI). SRS-RSRP may include the linear average of the power contributions of the SRS to be measured over the configured resource elements within the considered measurement frequency bandwidth in the time resources in the configured measurement occasions. CLI-RSSI may include the linear average of the total received power observed only in certain OFDM symbols of measurement time resource(s), in the measurement bandwidth, over the configured resource elements for measurement by the UE. For both SRS-RSRP and CLI-RSSI measurement reports, both events may be triggered and periodic reporting is supported. Layer 3 (L3) filtering may be applied, such that for CLI-RSSI measurements, the implementation of the UE may determine whether to reset filtering upon a bandwidth part (BWP) switch. A dedicated measurement gap may not be needed.

As indicated above, FIGS. 3A and 3B are provided as one or more examples. Other examples may differ from what is described with regard to FIGS. 3A and 3B.

Figure 4:
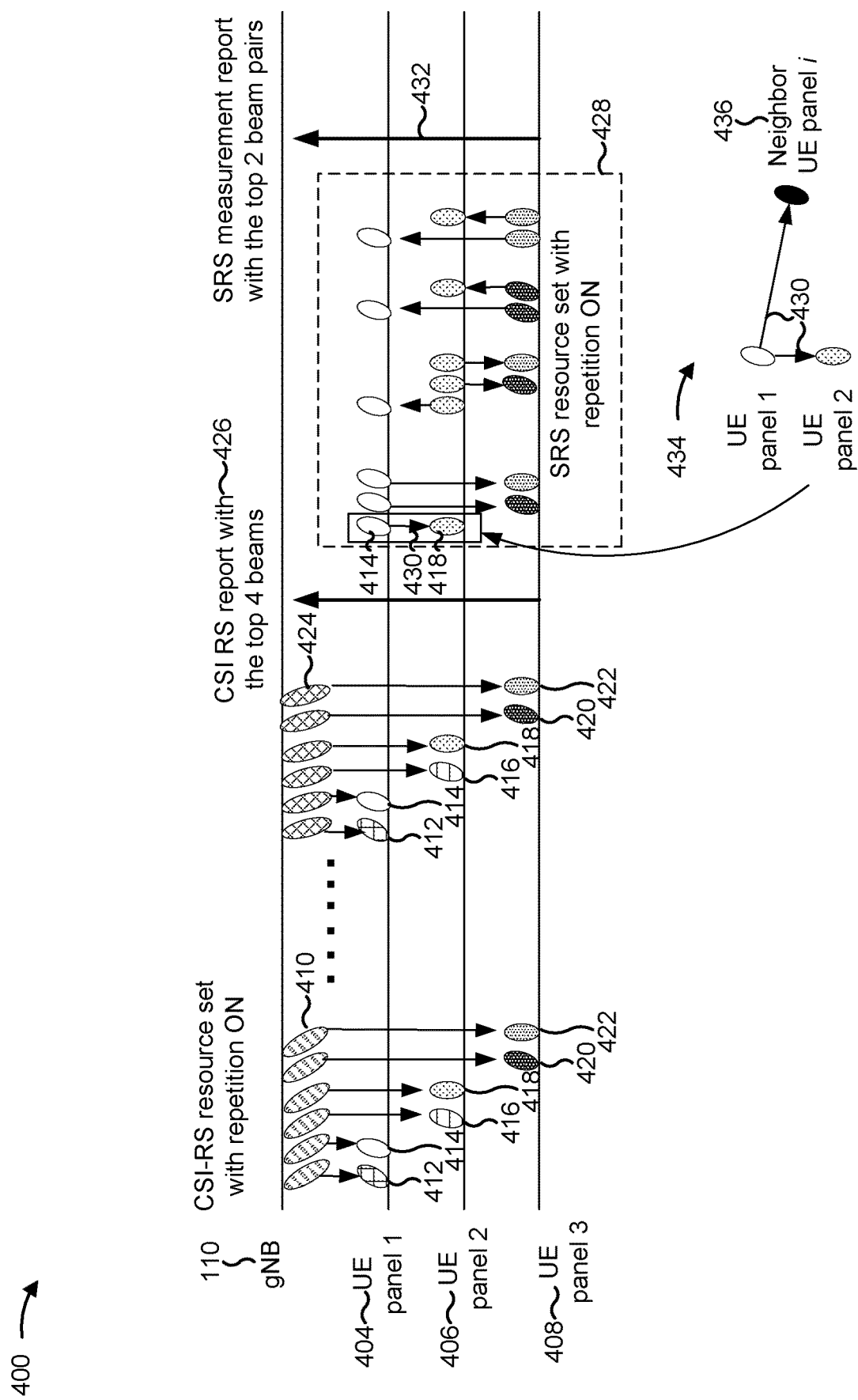
FIG. 4 is a diagram illustrating an example of self-interference measurement based at least in part on a channel state information (CSI) reference signal (CSI-RS) measurement for beam management.

FIG. 4 is a diagram illustrating an example 400 of self-interference measurement based at least in part on a CSI-RS measurement for beam management. Example 400 involves a base station 110 (shown as a gNB), and a UE comprising multiple UE panels (e.g., UE panels 1, 2, and 3, shown by reference numbers 404, 406, and 408, respectively). Generally, beams are represented by ovals in FIG. 4. An oval with a given fill represents a beam, and two or more ovals with the same fill, at different locations in FIG. 4, may represent the same receive beam or transmit beam at different times. For example, reference number 410 shows a set of channel state information reference signals (CSI-RSs) that are transmitted by the base station 110 on a first beam in a CSI-RS resource set with repetition. The UE may measure the CSI-RSs using respective receive beams 412, 414, 416, 418, 420, 422. Reference number 424 shows a set of CSI-RSs that are transmitted by the base station 110 on a second beam in a CSI-RS resource set with repetition. Again, the UE may measure the CSI-RSs using the respective receive beams 412, 414, 416, 418, 420, 422.

As shown by reference number 426, the UE may transmit a CSI-RS report to the base station 110. The CSI-RS report may indicate a top N beams, determined based at least in part on the measurements performed using the receive beams 412 through 422. In example 400, N is 4, though N can use other values. The top N beams may be selected based at least in part on one or more metrics, described elsewhere herein. Here, the 4 CSI-RS beams associated with the 4 Rx beams 414, 418, 420, and 422, are selected (not shown).

Reference number 428 shows the determination of self-interference measurements by the UE 120 based at least in part on the selected beams. An arrow from a first beam to a second beam may indicate that the first beam transmits a reference signal that is measured using the second beam to determine a self-interference measurement. For example, the arrow shown by reference number 430 indicates the transmission of a sounding reference signal (SRS) using the beam 414 that is measured using the beam 418 to determine a self-interference measurement for this Tx and Rx beam pair. The SRSs may be associated with an SRS resource set with repetition configured. In example 400, each pairing of transmit and receive beams from beams 414, 418, 420, and 422 is measured with the exception of the beam pairs formed by beams 420 and 422, since beams 420 and 422 are associated with the same panel. As shown by reference number 432, the UE may transmit an SRS measurement report indicating a top 2 beam pairs based at least in part on the self-interference measurements determined in connection with reference number 428.

As shown by reference number 434, in some aspects, a UE may determine a cross-link interference (CLI) measurement based at least in part on a reference signal associated with a self-interference measurement. For example, the same SRS transmission used to measure self-interference from beam 414 to beam 418 may be used by a neighbor UE to measure CLI at a panel i of the neighbor UE, as shown by reference number 436.

As indicated above, FIG. 4 is provided as an example. Other examples may differ from what is described with regard to FIG. 4.

Figure 5:
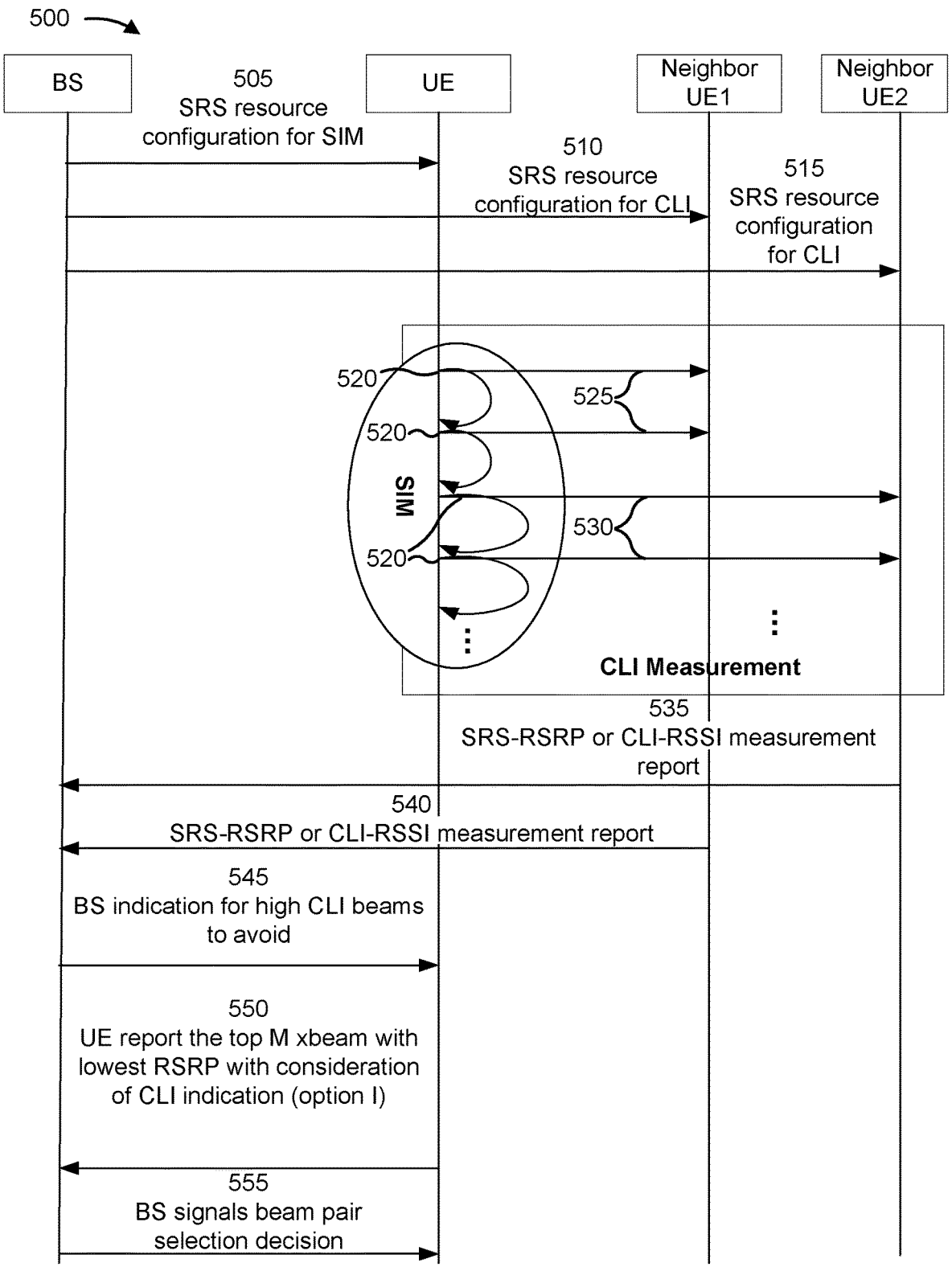
FIG. 5 is a diagram illustrating an example of signaling associated with self-interference measurement for a UE and cross-link interference measurement for one or more neighbor UEs.

FIG. 5 is a diagram illustrating an example 500 of signaling associated with self-interference measurement for a UE and cross-link interference measurement for one or more neighbor UEs. As shown, example 500 includes a BS (e.g., BS 110), a UE (e.g., UE 120), and two neighbor UEs (e.g., UE 120), shown as Neighbor UE1 and Neighbor UE2.

As shown by reference number 505, the BS may provide, to the UE, a resource configuration for self-interference measurement (SIM). For example, the resource configuration may be an SRS resource configuration that indicates one or more SRSs to be transmitted by the UE 120. As shown by reference numbers 510 and 515, the BS may provide, to the neighbor UEs, resource configurations for cross-link interference (CLI) measurement. For example, the resource configurations for CLI measurement may be associated with or may share resources with the SRS resource configuration for the SRSs to be transmitted by the UE for SIM. As shown by reference number 520, the UE may transmit SRSs, and may perform SIM based at least in part on the SRSs. The curved arrows from the SRSs back to the UE indicate that the UE performs SIM on the SRSs. As shown by reference number 525 and 530, the neighbor UEs may perform CLI measurements, in accordance with the SRS resource configuration, using the SRSs transmitted by the UE.

As shown by reference numbers 535 and 540, the neighbor UEs may transmit measurement reports based at least in part on the CLI measurements. For example, the measurement reports may include an SRS reference signal received power (RSRP) report, a CLI received signal strength indicator (RSSI) report, and/or the like. In some aspects, as shown by reference number 545, the BS may provide, to the UE, an indication of one or more beams, associated with high CLI measurements (e.g., CLI measurements that satisfy a threshold), that the UE is to avoid.

As shown by reference number 550, the UE may report a top M crossbeams (xbeams) (where M is an integer) with a lowest RSRP of the beams measured by the UE. In some aspects, the top M crossbeams may be selected based at least in part on the CLI indication shown by reference number 545. As shown by reference number 555, the BS may transmit information indicating a beam pair selection decision. For example, the BS may select a UL/DL beam pair for the UE, and may signal the selected UL/DL beam pair to the UE. In some aspects, the BS may select the UL/DL beam pair based at least in part on the CLI measurement feedback shown by reference numbers 535 and 540.

Figure 6:
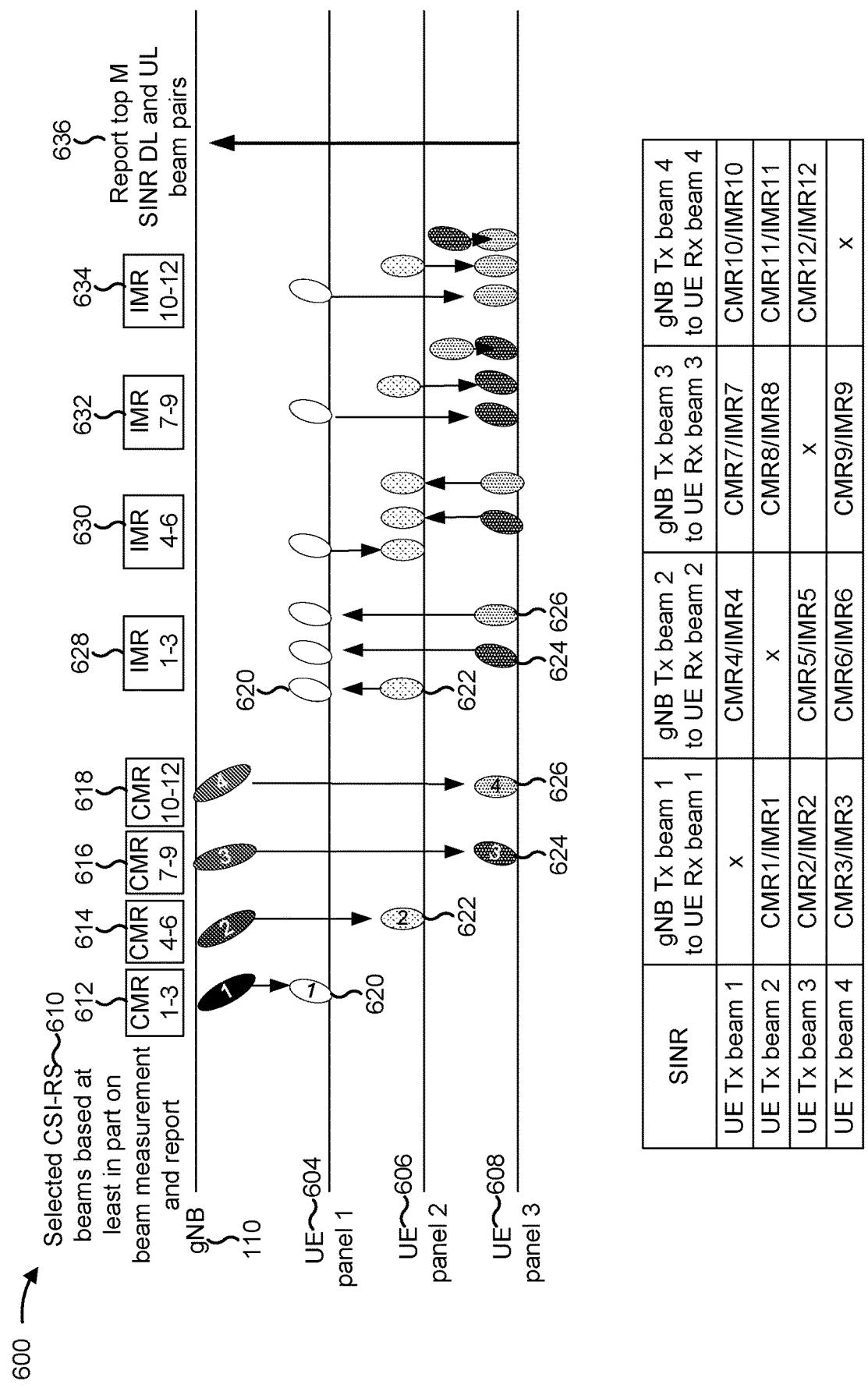
FIG. 6 is a diagram illustrating a beam measurement process.

FIG. 6 is a diagram 600 illustrating a beam measurement process. The diagram 600 of FIG. 6 includes a base station 110, and a UE comprising multiple UE panels (e.g., UE panel 1 604, UE panel 2 606, UE panel 3 608). The base station 110 and UE may be configured to select CSI-RS beams based at least in part on a beam measurement procedure (e.g., 610). The beam measurement procedure 610 may allow for the UE panels (e.g., 604, 606, 608) to measure CSI-RS signals from the base station 110 to determine which of the Rx beams are the best at the UE side, which may be based at least in part on the DL signal strength measured at the UE panels. The beam measurement procedure 610 may allow for the base station 110 to transmit multiple CSI-RS resources to the UE panels in order to measure the DL channel quality or signal strength at the UE side. The UE may send a CSI-RS report to the base station 110 indicating the top Tx beams at the base station with each associated with a top Rx beam at the UE side. The top Rx beams may be assumed to be the top Tx beams at the UE panels based at least in part on channel reciprocity. In some aspects, the UE may report the top four Tx beams. However, in some aspects, the UE may report more or less than the top four Tx beams. Upon the determination of the top four Tx beams with the associated top Rx beams at the UE, the UE may perform a SIM. The UE may also report the top four beams, each with an associated panel ID of the UE, so that gNB can avoid configuring intra-panel SIM to save resource overhead.

To perform the SIM, the UE may transmit a transmission from the beam 620 from UE panel 1 604, such that beams 622, 624, and 626 may measure the amount of energy they receive from the transmission of the beam 620. The transmission from the beam 620 may be an uplink transmission to the base station 110; however, during the uplink transmission from beam 620 to the base station 110, some energy may be received at the beams of the other panels. Such energy may be due to side lobes or based at least in part on the configuration of the other panels. As a result, the beams 622, 624, and 626 may measure the amount of self-interference caused by the transmission from the beam 620. This process repeats for all of the top four beams indicated in the CSI-RS report. For example, beam 622 may carry a transmission such that beams 620, 624, and 626 measure the amount of self-interference caused by the transmission from beam 622. Upon the completion of the self-interference procedure and the channel measurement procedure, the UE may transmit an indication 636 to the base station 110 indicating the top DL and UL beam pairs of the UE in a L1-SINR report via either the actual value or a largest value plus differential value of SINR. The DL and UL beam pairs selected as the top DL and UL beam pairs are beams that have passed a threshold for selection. In some aspects, the UE may report that no beams pass the threshold, such that no feasible beam and/or beam pair is present.

To perform the self-interference, a modified Layer 1. Signal to Interference plus Noise Ratio (L1-SINR) configuration and procedure may be utilized. L1-SINR may include two resource settings, the first resource setting, which may be provided by the higher layer parameter resourcesForChannelMeasurement, is configured to perform channel measurement (CM) via CSI-RS. The CM may measure the channel quality. The second resource, which may be provided by either higher layer parameter csi-IM-ResourcesForInterference or the higher layer parameter nzp-CSI-RS-ResourcesForInterference, is configured to perform interference measurement (IM) via CSI-RS. The modified L1-SINR may be configured to utilize SRS, instead of CSI-RS, to perform the IM procedure for SIM purpose. Each CSI-RS resource for channel measurement resource (CMR) may be associated with one SRS resource for interference measurement resource (IMR). The number of CSI-RS resources for CM may be equal to the number of SRS resources for IM. The CMR may also be re-used for the original L1-SINR beam management purposes. In addition, the IMR may also be reused for CLI measurement purposes concurrently to measure the cross link interference at neighbor UEs using the same SRS resources used for SIM. In some aspects, the IMR configuration may be configured to define a full or reduced Tx power. For example, the reduced Tx power may be based at least in part on X dBm or X % of the full Tx power. The UE may use the configuration to scale up the calculated SINR accordingly.

With reference to FIG. 6, the diagram 600 provides an example of the CM and IM using the modified L1-SINR configuration and procedure. The CM portion includes four CMRs 612, 614, 616, 618 such that the base station 110 is configured to transmit a CSI-RS to each of the top four Rx beams of the UE. For example, CMR 612 may be transmitted to Rx beam 620 of UE panel 1 604, CMR 614 may be transmitted to Rx beam 622 of UE panel 2 606, CMR 616 may be transmitted to Rx beam 624 of UE panel 3 608, and CMR 618 may be transmitted to Rx beam 626 of UE panel 3 608. The UE may measure the channel quality received at the UE by the corresponding Rx beams. The UE may store the channel quality measurements under the CMR to determine the SINR.

The IM portion includes the same or more amount of resources as in the CM portion, such that the CMRs are mapped to a corresponding IMR. For example, each CMR is associated with an IMR for the interference measurement. Each CMR can also be mapped to multiple IMRs for measuring the interference to the same Rx beam as the CMR but transmitting from different beams of different panels of the UE. The IM portion includes four IMRs 628, 630, 632, 634 that may each be mapped to a corresponding CMR. For example, CMR 612 may be mapped to IMR 628, CMR 614 may be mapped to IMR 630, CMR 616 may be mapped to IMR 632, and CMR 618 may be mapped to IMR 634. The IM portion allows for SIM to be performed. To perform SIM, the IMRs configure the UE with SRS resources. Each of the beams (e.g., 620, 622, 624, 626) may be configured to transmit an SRS. For example, the UE panels when sending the uplink transmission for the SIM may transmit an SRS. The transmitted SRS may be utilized to measure SIM. In some aspects, the UE panel 1 604 may transmit the SRS at beam 620, such that beams 622, 624, and 626 may measure the amount of self-interference that is caused by the transmission from the beam 620. This process repeats for all the other beams 622, 624, 626. For example, beam 622 may send a transmission such that beams 620, 624, and 626 measure the amount of self-interference caused by the transmission from beam 622. Upon the completion of the CM and the SIM, an SINR may be determined.

The mapping of the CMRs and the IMRs allows for an SINR to be calculated based at least in part on the results of the CM and IM portions. The SINR may be determined based at least in part on a ratio of the CMR and the corresponding IMR, as shown in the table of FIG. 6.

The aspect of FIG. 6 provides an example of CM and IM resources being time division multiplexed (TDM), such that the CM portion and the IM portion occur at different times. In some aspects, a DL timing may be utilized for the CM, while a UL timing may be utilized for the IM. In such instances, the SINR may be calculated based at least in part on a ratio of CM and IM and noise (e.g., CM/(IM+noise)). Upon the calculations of the SINR, the UE may report the SINR results to the base station 110. The SINR results may include a report of the top SINR DL and UL beam pairs.

As indicated above, FIG. 6 is provided as an example. Other examples may differ from what is provided with regard to FIG. 6.

Figure 7:
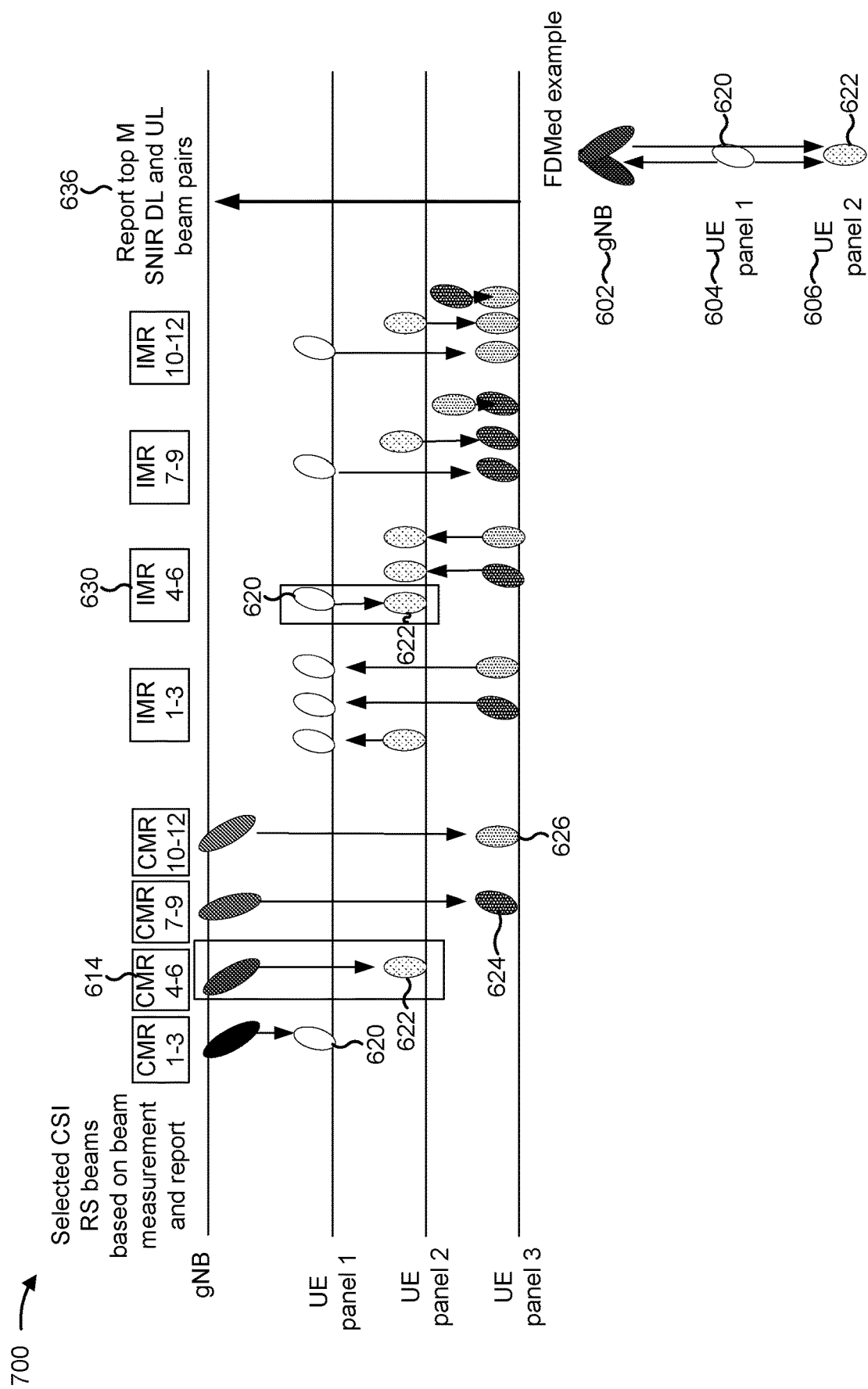
FIG. 7 is a diagram illustrating CM and IM using a modified Layer 1 signal to interference plus noise ratio (SINR) configuration and procedure.

FIG. 7 is a diagram 700 illustrating CM and IM using a modified L1-SINR configuration and procedure. In the example of FIG. 7, the CM and IM resources are configured in a frequency division multiplexed (FDM) configuration, such that the CM and IM occur concurrently. For example, the CMR 614 and IMR 630 are shown in the FDM configuration. The base station 110 may transmit the CSI-RS to be received by beam 622 of UE panel 2 606, while the beam 620 transmits the SRS that is received by beam 622 of UE panel 2 606. The UE may measure the reception of the CSI-RS and the SRS in order to determine the SINR for the Rx beam 622. In some aspects, the CM and IM procedures under the FDM configuration may experience time misalignment for DL and/or UL reference signals (RSs). In some aspects, the UE may utilize DL timing or UL timing for both the CM and IM procedures concurrently happening in the FDM configuration. In aspects utilizing DL timing, the UE may calculate RSRP of the CSI-RS, and may calculate a partial RSSI for the interference, then an estimated SINR may be calculated based at least in part on the CM and IM procedures.

In some aspects, a SINR may not be determined if the Rx and Tx beam are on the same panel. For example, with reference to FIG. 6, an SINR may not be determined for a Rx beam 624 and a Tx beam 626, because Rx beam 624 and Tx beam 626 are associated with a same panel. However, the base station may not be aware of the panel ID when configuring the SRS resources for the IMR. In such aspects, the base station may be configured to indicate whether the UE should still transmit the SRS in instances where the SRS beam and the SIM beam are on the same panel. In some aspects, the base station may be configured to indicate whether the UE should still transmit the SRS if the SRS is being reused for a CLI measurement at a neighbor UE.

In some aspects, the UE may be configured to indicate that one or more particular beam pairs may be an infeasible beam pair, such that the SRS beam and the SIM beam are on the same panel. In some aspects, the UE may be configured to indicate to the UE the existence of one or more infeasible beam pairs during the SIM configuration phase. In response to receiving the indication of infeasible beam pairs, the base station may update the SIM configuration and skip or prevent the configuring of intra-panel beam measurements, which may assist in conserving resources. In some aspects, if the UE indicates the existence of infeasible beam pairs, then the reported value of such beam pairs may be reported as background interference, instead of a self-interference value. In some aspects, such as for SIM, the UE may be configured to report beam with panel ID.

As indicated above, FIG. 7 is provided as an example. Other examples may differ from what is described with regard to FIG. 7.

Figure 8B:
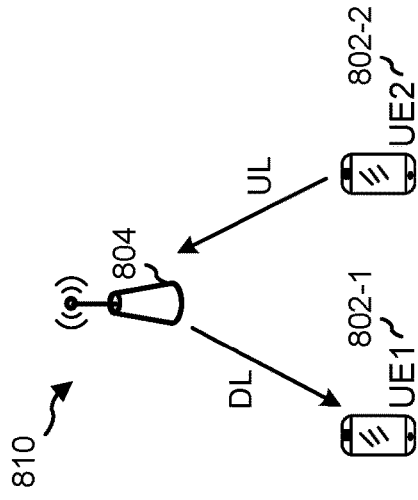
FIGS. 8A-8C are diagrams illustrating examples of full duplex (FD) communication.
Figure 8C:
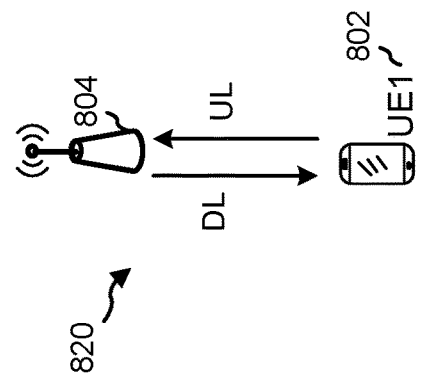
Figure 8A:
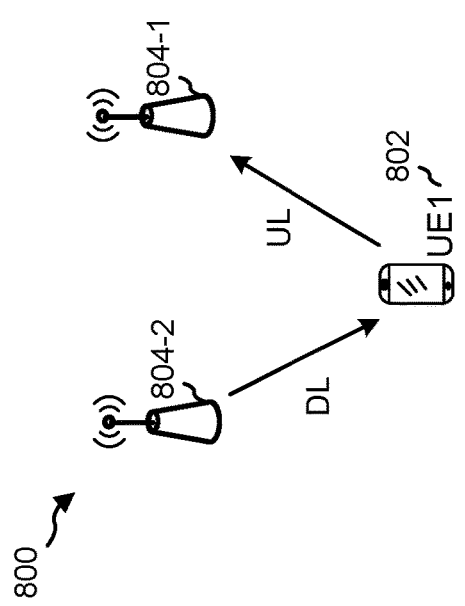

FIGS. 8A-8C are diagrams illustrating examples 800, 810, and 820 of full duplex (FD) communication. The example 800 of FIG. 8A includes a UE1 802 and two base stations (e.g., TRPs) 804-1, 804-2 (e.g., base station 110), wherein the UE1 802 is sending UL transmissions to base station 804-1 and is receiving DL transmissions from base station 804-2. In the example 800 of FIG. 8A, FD is enabled for the UE1 802, but not for the base stations 804-1, 804-2. The example 810 of FIG. 8B includes two UEs, UE1 802-1 and UE2 802-2, and a base station 804, wherein the UE1 802-1 is receiving a DL transmission from the base station 804 and the UE2 802-2 is transmitting a UL transmission to the base station 804. In the example 810 of FIG. 8B, FD is enabled for the base station 804, but not for the UEs UE1 802-1 and UE2 802-2. The example 820 of FIG. 8C includes a UE1 802 and a base station 804, wherein the UE1 802 is receiving a DL transmission from the base station 804 and the UE1 802 is transmitting a UL transmission to the base station 804. In the example 820 of FIG. 8C, FD is enabled for both the UE1 802 and the base station 804.

The present disclosure generally relates to improving the manner in which flexible TDD operates to allow for FD communication, which may include simultaneous UL/DL transmission in frequency range 2 (FR2). Flexible TDD capability may be present at either a base station or UE, or both. For example, for a UE, UL transmission may be from one antenna panel, and DL reception may be in another antenna panel. FD communication may be conditional on a beam separation of the UL beam and DL beam at the respective antenna panels. As such, improving the manner in which the selection of the UL beam and DL beam for FD communication is performed is desirable. Utilizing FD communication may provide a reduction in latency, such that it may be possible to receive a DL signal in UL only slots, which may enable latency savings. In addition, FD communication may enhance spectrum efficiency per cell or per UE, and may allow for a more efficient utilization of resources.

Beam separation of the UL and DL beams assists in limiting or reducing self-interference that may occur during FD communication. It is desirable to select UL and DL beams that are on different antenna panels to minimize self-interference. Determining the UL and DL beams that are separated on their respective antenna panels may provide a reliable FD communication by selecting beam pairs that minimize or reduce self-interference. As such, measuring the self-interference at the UE may assist in determining beam pairs of UL and DL beams that may support FD communication.

As indicated above, FIGS. 8A-8C are provided as one or more examples. Other examples may differ from what is described with regard to FIGS. 8A-8C.

Figure 9:
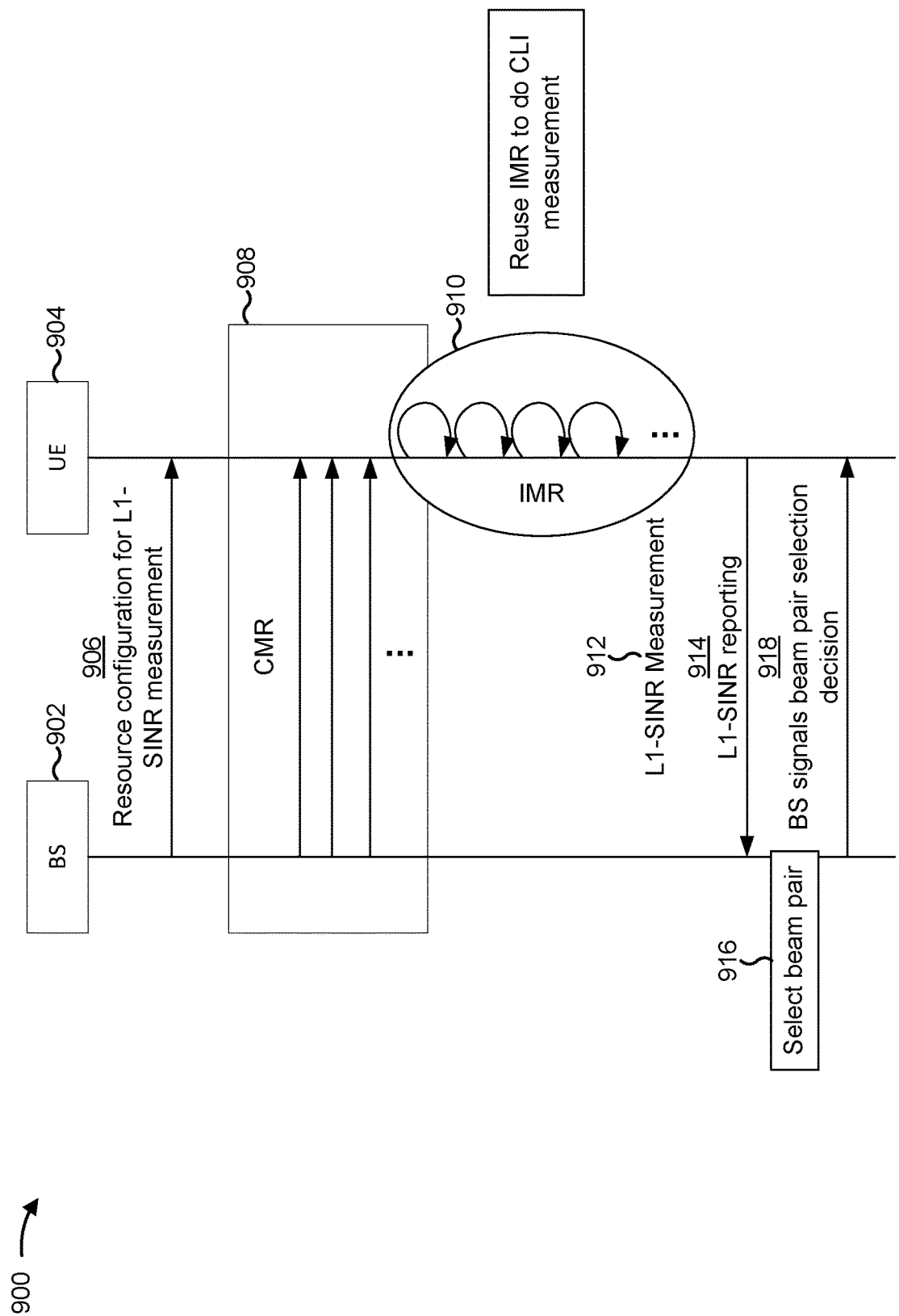
FIG. 9 is a call flow diagram for self-interference measurement between a UE and a base station.

FIG. 9 is a call flow diagram 900 between a UE 902 (e.g., UE 120) and a base station 904 (e.g., BS 110). The base station 904 may provide a cell serving UE 902.

As illustrated in FIG. 9, the base station 904 may provide, to the UE 902, a resource configuration 906 to perform an L1-SINR measurement. The L1-SINR configuration 906 may include a resource configuration for a CM process and a resource configuration for a SIM process. The base station 904 may configure the UE 902 for the CM process 908. The CM process 908 may be based at least in part on a determined subset of Tx beams of a base station, wherein CM may be measured based at least in part on CSI-RS transmitted from the base station 904. In some aspects, the CM process may be part of an L1-SINR measurement. The UE 902 may perform the CM process 908 based at least in part on a determined subset of Rx beams. In some aspects, the CM process may comprise performing a channel measurement between each of the subset of Rx beams with a corresponding antenna array panel of the plurality of different antenna array panels, and an associated Tx beam at the base station 904.

The base station 904 may also configure the UE for the SIM process 910. The configuration for the SIM process 910 may configure the UE to sweep through transmitting sounding reference signals (SRS) from a same Tx beam corresponding to each Rx beam of one antenna array panel of a plurality of different antenna array panels. The configuration for the SIM process 910 may configure the UE to receive the transmitted SRS incrementally through other Rx beams associated with the plurality of different panels. The SIM process may modify an IM process of an L1-SINR measurement. In some aspects, a plurality of Tx beams may be received by each Rx beam of one panel of the plurality of different panels. In some aspects, a first resource configuring the CM process may be associated with a second resource configuring an IM process. The IM process may comprise the SIM process, wherein an interference measurement resource (IMR) of the SIM process may be concurrently used for CLI measurement. The base station 904 may configure the UE 902 with a transmission power for transmitting SRS as part of the SIM process 910. In some aspects, a configuration for IMR may include an indicator for a full SRS Tx power or a reduced SRS Tx power. The reduced SRS Tx power may be reduced based at least in part on a ratio (e.g., dBm) or a percentage of the full SRS Tx power. A channel measurement resource (CMR) of the CM process may be mapped to one or more IMRs to measure multiple interference Tx beams to a same Rx beam. The Rx beam may be used to receive an associated CSI-RS transmission from a base station for the CM process. In some aspects, the CM process may be used for an L1-SINR beam management process. In some aspects, the first resource configuring the CM process and the second resource configuring the SIM process may be configured in a time division multiplexed (TDM) configuration. The first resource may comprise a plurality of resources for the CM process, wherein the second resource comprises a plurality of resources for the SIM process. In some aspects, downlink timing may be utilized to perform the CM process, and uplink timing may be utilized to perform the SIM process. In some aspects, the first resource configuring the CM process and the second resource configuring the SIM process may be configured in a frequency division multiplexed (FDM) configuration, wherein the CM process and the SIM process are performed concurrently. In some aspects, downlink timing may be utilized to perform the CM process and SIM process concurrently. In some aspects, uplink timing may be utilized to perform the CM process and SIM process concurrently.

In some aspects, the UE 902 may determine a subset of Rx beams based at least in part on a beam measurement process. The base station 904 may configure the UE 902 to perform the beam measurement process. Each Rx beam of the subset of Rx beams may be associated with one antenna array panel of a plurality of different antenna array panels. The beam measurement process may comprise receiving, from a base station 904, SRS at each Rx beam of the plurality of different antenna array panels, wherein each Rx beam may be associated with a Tx beam from the base station 904. The subset of Rx beams may be indicated as top candidate beams selected based at least in part on the beam management process to be used for sweeping through SRS of the SIM process 910.

The UE 902 may measure, for at least one pair of Tx/Rx beams of the subset of beams, a self-interference based at least in part on the received SRS in the SIM process 910. In some aspects, the UE 902 may report a panel identifier (ID) associated with each Rx beam of the subset of beams. The UE 902 may report the panel ID associated with each Rx beam of the subset of beams to the base station.

The UE 902 may determine an SINR 912 based at least in part on results of the CM process 908 and the SIM process 910. A CMR of the CM process 908 may be mapped to one or more IMRs of the SIM process 910. The SINR 912 may be determined by each pair of CMR and IMR measurement results. The UE 902 may select one or more pairs of Tx/Rx beams having the highest SINR values. In some aspects, the UE 902 may select M pairs of Tx/Rx beams based at least in part on the SINR, where M≥0. The UE 902 may report the selected Tx/Rx beams to the base station 904. The UE 902 may select the one or more pairs of Tx/Rx beams based at least in part on the SINR values 912.

The UE 902, at 914, may transmit, to the base station 904, an SINR report indicating the SINR results for each pair of CMR and IMR. The SINR report may include one or more SINR values for each of the subset of Rx beams with an associated Tx beam of the UE and corresponding Tx and Rx beam IDs or corresponding CSI-RS IDs or resource IDs. The UE 902 may select the top one or more DL and UL beam pairs based at least in part on the SINR values to perform L1-SINR reporting based at least in part on an actual value or a largest value plus a differential value of SINR, wherein the top one or more DL and UL beams pairs pass a threshold. In some aspects, the UE 902 may report that no DL and UL beam pairs are feasible to perform L1-SINR reporting if none of the DL and UL beam pairs satisfy the threshold. In some aspects, the threshold may be configured by the base station and signaled to the UE via radio resource control (RRC) signaling, a medium access control control element (MAC-CE), or downlink control information (DCI). In some aspects, the UE 902 may receive, from the base station 904, an indication 918 of a selection of the DL and UL beam pairs.

The base station 904, at 916, may select a Tx UL beam/Rx DL beam pair with the UE 902 based at least in part on the received SINR report 914 from the UE 902. In some aspects, selecting the Tx beam/Rx beam pair may include selecting a Tx beam or a Rx beam that may be greater than a SINR threshold. In some aspects, the base station 904 may receive, from the UE 902, an indication that a pair of Tx/Rx beams may not be compatible for the SIM if the pair of Tx/Rx beams are on the same antenna array panel. In some aspects, results of the SIM process may indicate that measurements associated with the pair of Tx/Rx beams identified as not compatible for the SIM process may be reported as a background interference value instead of a self-interference value. In some aspects, the base station 904 may send, to the UE 902, an indication as to whether to transmit the SRS if the SRS beam and the self-interference measurement beam are on the same panel. In some aspects, if the indication configures the UE 902 to transmit the SRS using beams on the same panel, then the UE 902 may be configured to use the SRS for CLI measurements but not for the SIM process 910. In some aspects, the base station 904 may receive, from the UE 902, the indication that the pair of Tx/Rx beam may not be compatible in a SIM configuration phase, if the Tx/Rx beam are on the same panel.

In some aspects, the UE 902 may report, to the base station 904, a pair of Tx/Rx beams that may not be compatible for the SIM process if the pair of Tx/Rx beams are on the same antenna array panel. In some aspects, the results of the SIM process may indicate that measurements associated with the pair of Tx/Rx beams identified as not compatible for the SIM process may be reported as a background interference value instead of a self-interference value. In some aspects, the UE 902 may receive, from the base station 904, an indication as to whether to transmit the SRS if the SRS beam and the self-interference measurement beam are on the same panel. In instances where the indication indicates that the UE is to transmit the SRS using beams on the same panel, then the SRS may be used for CLI measurements but not for the SIM process. In some aspects, the UE 902 may be configured to indicate that the pair of Tx/Rx beams may not be compatible in a SIM configuration phase, if the Tx/Rx beams are on the same panel.

As indicated above, FIG. 9 is provided as an example. Other examples may differ from what is provided with regard to FIG. 9.

A full-duplex (FD) UE may perform a self-interference measurement (SIM) procedure in association with a channel measurement (CM) procedure in order to identify self-interference from transmissions of the FD UE. For example, the FD UE may be configured with resources for the CM procedure and the SIM procedure. The CM procedure may be based at least in part on a determined subset of transmit beams of a base station, wherein CM may be measured based at least in part on CSI-RS transmitted from the base station. The SIM procedure may be based at least in part on sounding reference signals (SRSs). For example, the configuration for the SIM procedure may configure the UE to sweep through transmitting SRSs from a same Tx beam corresponding to each Rx beam of one antenna array panel of a plurality of different antenna array panels. "Sweeping" through a plurality of beams may refer to transmitting or receiving a communication on each beam of the plurality of beams in sequence. The configuration for the SIM procedure may configure the UE to receive the transmitted SRS incrementally through other Rx beams associated with the plurality of different panels. However, the usage of SRSs for the SIM procedure may involve significant overhead, and may interrupt the normal course of communication by the FD UE, thereby reducing throughput and increasing consumption of computing resources.

Some techniques and apparatuses described herein provide the performance of a SIM using one or more uplink signals transmitted in the course of data transmission by the UE, such as a physical uplink shared channel (PUSCH), a physical uplink control channel (PUCCH), or a demodulation reference signal (DMRS) associated with the PUSCH or the PUSCH. Thus, the DMRS may be used not only for uplink channel estimation, but also for SIM. Some techniques and apparatuses described herein also provide configuration of the SIM for the one or more uplink signals, such as modifications to PUCCH formats, configured grant allocations to PUCCH formats involving filtered measurement, and dynamic allocations involving unfiltered measurement. By using the PUSCH/PUCCH/DMRS for the SIM procedure, efficiency of the SIM is improved and overhead is reduced, thereby conserving computing and communication resources of the UE and the BS.

Figure 10:
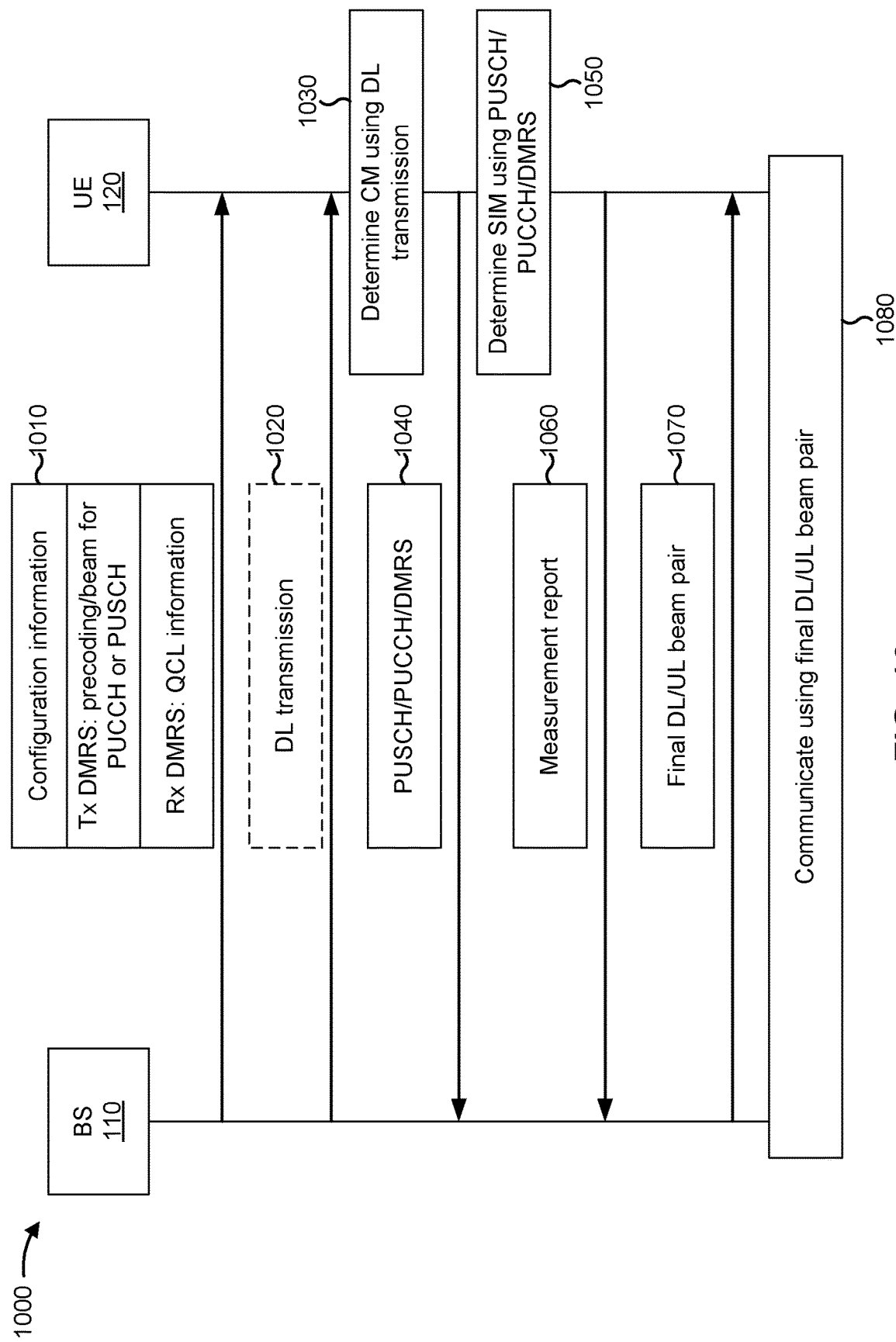
FIG. 10 is a diagram illustrating an example 1000 of signaling associated with determination of a self-interference measurement using a control or data transmission of a UE, in accordance with the present disclosure.

FIG. 10 is a diagram illustrating an example 1000 of signaling associated with determination of a self-interference measurement using a control or data transmission of a UE, in accordance with the present disclosure. As shown, example 1000 includes a BS 110 and a UE 120. In some aspects, the BS 110 may provide a serving cell of the UE 120.

As shown by reference number 1010, the BS 110 may transmit configuration information to the UE 120. Generally, the configuration information may include information configuring at least a part of a data transmission (e.g., a PUSCH) or a control transmission (e.g., a PUCCH) to be used for a SIM procedure of the UE 120. For example, the data transmission, the control transmission, or a part of the data transmission or the control transmission (e.g., a DMRS and/or the like) may be used to determine a SIM associated with the SIM procedure.

In some aspects, and as shown, the configuration information may indicate a configuration for transmission (Tx) of a DMRS. For example, the configuration information may indicate a precoding configuration and/or a beam (e.g., a UL Tx beam) for transmission of the DMRS in order to perform the SIM. In some aspects, the configuration information may indicate that a precoding configuration and/or beam associated with the data transmission or the control transmission is to be used for the DMRS. For example, the configuration information may indicate to use a current precoding and/or beam for the PUCCH or the PUSCH for the transmission of the DMRS.

In some aspects, and as shown, the configuration information may indicate a configuration for reception (Rx) of the DMRS. For example, the configuration information may indicate a receive beam (e.g., a DL Rx beam) for reception of the DMRS in order to perform the SIM. In some aspects, the configuration information may indicate quasi-colocation (QCL) information for the beam. The QCL information may identify a source signal from which parameters for the receive beam are to be derived, and a QCL type that indicates which parameters are to be derived from the source signal. In some aspects, the configuration information may indicate QCL information for each measured DMRS resource associated with the SIM procedure. In some aspects, the QCL information may be provided in downlink control information or in a measurement configuration for the DMRS (e.g., similar to a CSI resource setting, which is the reception configuration for CSI-RS measurement).

In some aspects, the configuration information may relate to a PUSCH DMRS. For example, the configuration information may apply to a PUSCH DMRS configuration Type 1 (in which the DMRS is associated with alternating subcarrier mappings) or a PUSCH DMRS configuration Type 2 (in which the DMRS is associated with contiguous subcarrier mappings). Additionally, or alternatively, the configuration information may apply to a PUSCH mapping Type A, in which the DMRS is mapped to a third and/or fourth symbol of a slot, or a PUSCH mapping Type B, in which the DMRS is mapped to a first symbol of a slot.

In some aspects, the configuration information may relate to a data transmission or a control transmission associated with multiple repetitions. In this case, the DMRS may be transmitted at a plurality of locations. For example, the DMRS may be transmitted at different symbols, and may be transmitted for different inter-panel beams (e.g., may be transmitted in association with multiple reception beams of antenna panels other than an antenna panel that transmitted the DMRS at a given symbol). As another example, the data transmission or the control transmission may be associated with a repetition scheme. In this case, multiple repetitions of the data transmission or the control transmission may be transmitted with different repetition configurations (which may be referred to as transmitting multiple repetition configurations of the data transmission or the control transmission), and the DMRS may be transmitted using different transmit beams in accordance with the different repetition configurations. For example, the DMRS for a PUSCH with repetition can be used for SIM sweeping through different Rx inter-panel beams and with N repetitions used for SIM sweeping through different Tx beams. In some aspects, in each repetition configuration, the DMRS (or the data transmission or the control transmission) may be transmitted and/or received using multiple different beams. The above repetition configurations can be associated with slot-based or mini-slot-based repetition schemes. A mini-slot-based scheme may reduce latency associated with beam sweeping relative to a slot-based scheme.

In some aspects, the data transmission may be associated with a configured grant allocation. For example, the UE 120 may have or be configured with a set of periodic opportunities for PUSCH transmission with a DMRS. In this case, the SIM may be performed based at least in part on filtering, in which a plurality of SIMS are determined and/or combined based at least in part on a filtering pattern or threshold. In some aspects, the configured grant may include N repetitions, and each repetition may have a different Tx beam or spatial relation information. In this case, the PUSCH and/or the DMRS may be swept through multiple Tx beams and multiple Rx beams via repetition. In some aspects, the data transmission may be associated with a dynamic allocation (such as using DCI to grant resources for the data transmission) for an aperiodic PUSCH transmission. In this case, the UE 120 may perform SIM without filtering, which may provide more immediate measurement results than a filtering-based SIM procedure.

In some aspects, the control transmission may be associated with a PUCCH format. For example, a long PUCCH format (e.g., PUCCH Format 1, 3, or 4) may be configured for repetition across multiple slots to improve reliability or coverage. In this case, the DMRS associated with a PUCCH with a long PUCCH format may be swept across multiple Rx inter-panel beams, and the SIM procedure may be performed using the multiple Rx inter-panel beams. As used herein, "inter-panel beam" refers to an Rx beam generated by a different antenna panel than a corresponding Tx beam, or a Tx beam generated by a different antenna panel than a corresponding Rx beam.

In some aspects, the configuration information may configure a DL bandwidth part of the UE 120. In this case, the DL bandwidth part may include a bandwidth of the DMRS, so that the DMRS measures the spatial leakage without taking into account frequency leakage.

As shown by reference number 1020, the UE 120 may optionally receive a downlink transmission from the BS 110. In some aspects, the downlink transmission may be a PDSCH. In some aspects, the downlink transmission may be a reference signal, such as a CSI-RS or a downlink DMRS. In some aspects, the downlink transmission may be a DCI that schedules the data transmission or the control transmission. As shown by reference number 1030, the UE 120 may determine a CM using the downlink transmission. For example, the UE 120 may determine the CM using DMRS of the PDSCH, using the reference signal, or using the DCI. If the downlink transmission includes the DCI, then the DCI may schedule the CSI-RS used as the CMR.

As shown by reference number 1040, the UE 120 may transmit the data transmission or the control transmission in accordance with the configuration information. As shown by reference number 1050, the UE 120 may determine a SIM using at least part of the data transmission or the control transmission (e.g., a PUSCH, a PUCCH, and/or a DMRS). In some aspects, the control transmission may be associated with an acknowledgment or negative acknowledgment for a PDSCH received in the downlink transmission shown by reference number 1020. In some aspects, the control transmission may be scheduled by the DCI. The UE 120 may determine the SIM in accordance with the configuration information, as described above, by sweeping Tx and Rx beams through different resources and configurations.

It should be noted that, in some aspects, the UE 120 may determine a SIM using a PUSCH or a PUCCH. For example, the UE 120 may treat the PUSCH or the PUCCH as a reference signal, and may measure self-interference using one or more Rx beams corresponding to one or more transmissions of the PUSCH or the PUCCH. Thus, the techniques and apparatuses described herein are not limited to those involving determination of SIMs using DMRSs of a PUSCH or PUCCH.

In some aspects, another UE, not shown in FIG. 10, may perform a CLI procedure using at least part of the data transmission or the control transmission. For example, referring to FIG. 5, one or more neighbor UEs may use the data transmission or the control transmission as the transmission 525/530 for one or more CLI measurements. In this case, the one or more neighbor UEs may report a CLI value to a corresponding base station. In some aspects, the CLI procedure may be performed concurrently with the SIM.

As shown by reference number 1060, the UE 120 may provide a measurement report to the BS 110. The measurement report may identify one or more DL/UL beam pairs, and may identify SIMs and/or CMs associated with the one or more DL/UL beam pairs. As shown by reference number 1070, the BS 110 may transmit, to the UE 120, information indicating a final DL/UL beam pair. For example, the BS 110 may select the final DL/UL beam pair based at least in part on the measurement report, and may indicate the final DL/UL beam pair to the UE 120. The BS 110 and the UE 120 may communicate using the final DL/UL beam pair, as shown by reference number 1080.

In this way, the UE 120 performs a SIM procedure using an uplink transmission, such as a data transmission or a control transmission, in the course of transmitting the uplink transmission. This reduces overhead and improves resource utilization relative to configuring a dedicated transmission, such as an SRS and/or the like, for the SIM procedure.

As indicated above, FIG. 10 is provided as an example. Other examples may differ from what is described with respect to FIG. 10.

Figure 11:
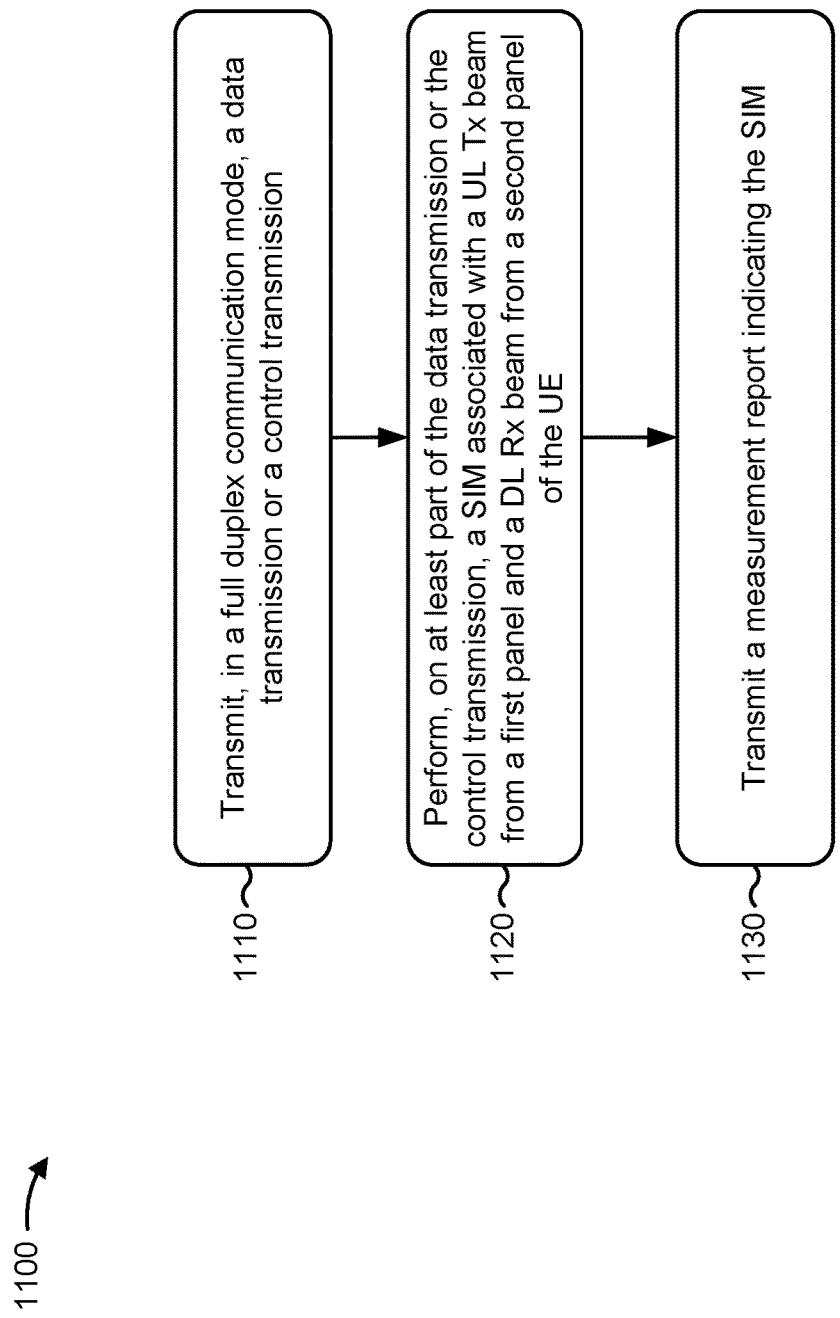
FIG. 11 is a diagram illustrating an example process performed, for example, by a user equipment, in accordance with the present disclosure.

FIG. 11 is a diagram illustrating an example process 1100 performed, for example, by a UE, in accordance with the present disclosure. Example process 1100 is an example where the UE (e.g., UE 120 and/or the like) performs operations associated with demodulation signal based self-interference measurement.

As shown in FIG. 11, in some aspects, process 1100 may include transmitting, in a full duplex communication mode, a data transmission or a control transmission (block 1110). For example, the UE (e.g., using controller/processor 280, transmit processor 264, TX MIMO processor 266, MOD 254, antenna 252, and/or the like) may transmit, in a full duplex communication mode, a data transmission or a control transmission, as described above.

As further shown in FIG. 11, in some aspects, process 1100 may include performing, on at least part of the data transmission or the control transmission, a SIM associated with a UL Tx beam from a first panel and a DL Rx beam from a second panel of the UE (block 1120). For example, the UE (e.g., using antenna 252, DEMOD 254, MIMO detector 256, receive processor 258, controller/processor 280, and/or the like) may perform a SIM associated with a UL Tx beam from a first panel and a DL Rx beam from a second panel of the UE, based at least in part on at least part of the data transmission or the control transmission, as described above.

As further shown in FIG. 11, in some aspects, process 1100 may include transmitting a measurement report indicating the SIM (block 1130). For example, the UE (e.g., using controller/processor 280, transmit processor 264, TX MIMO processor 266, MOD 254, antenna 252, and/or the like) may transmit a measurement report indicating the SIM, as described above.

Process 1100 may include additional aspects, such as any single aspect or any combination of aspects described below and/or in connection with one or more other processes described elsewhere herein.

In a first aspect, the SIM is performed using a demodulation reference signal (DMRS) of the data transmission or the control transmission.

In a second aspect, alone or in combination with the first aspect, the DMRS is transmitted using a same precoding or beam as the data transmission or the control transmission.

In a third aspect, alone or in combination with one or more of the first and second aspects, the DMRS is transmitted on the UL Tx beam, and process 1100 further comprises receiving information indicating a quasi-colocation configuration for the DL Rx beam corresponding to the UL Tx beam associated with the SIM.

In a fourth aspect, alone or in combination with one or more of the first through third aspects, the information indicating the quasi-colocation configuration is received in at least one of downlink control information or a measurement configuration for the demodulation reference signal.

In a fifth aspect, alone or in combination with one or more of the first through fourth aspects, the DMRS is associated with a configuration type associated with alternating subcarrier mappings.

In a sixth aspect, alone or in combination with one or more of the first through fifth aspects, the DMRS is associated with a configuration type associated with contiguous subcarrier mappings.

In a seventh aspect, alone or in combination with one or more of the first through sixth aspects, the DMRS is associated with a shared channel type indicating that the DMRS is mapped to a third or fourth symbol of a slot.

In an eighth aspect, alone or in combination with one or more of the first through seventh aspects, the DMRS is associated with a shared channel type indicating that the DMRS is mapped to a first symbol of a slot.

In a ninth aspect, alone or in combination with one or more of the first through eighth aspects, the DMRS is associated with a plurality of DMRSs that are transmitted at different symbols of one or more slots, where the plurality of DMRSs sweep through different receive beams of one or more panels of the UE other than a panel used to transmit the plurality of DMRSs on corresponding transmit beams.

In a tenth aspect, alone or in combination with one or more of the first through ninth aspects, the data transmission or the control transmission is associated with a repetition scheme, and transmitting the data transmission or the control transmission comprises transmitting multiple repetition configurations of the data transmission or the control transmission, where the DMRS is transmitted using multiple different transmit beams based at least in part on the repetition scheme.

In an eleventh aspect, alone or in combination with one or more of the first through tenth aspects, in each repetition configuration of the multiple repetition configurations, the DMRS is received using multiple different receive beams based at least in part on the repetition scheme.

In a twelfth aspect, alone or in combination with one or more of the first through eleventh aspects, the repetition scheme is a slot-based repetition scheme.

In a thirteenth aspect, alone or in combination with one or more of the first through twelfth aspects, the repetition scheme is a mini-slot-based repetition scheme.

In a fourteenth aspect, alone or in combination with one or more of the first through thirteenth aspects, the DMRS is an uplink DMRS, and a bandwidth of the uplink DMRS is included in a downlink bandwidth part of the UE.

In a fifteenth aspect, alone or in combination with one or more of the first through fourteenth aspects, the DMRS is associated with a cross-link interference measurement procedure, and process 1100 further comprises performing the cross-link interference measurement procedure concurrently with the SIM.

In a sixteenth aspect, alone or in combination with one or more of the first through fifteenth aspects, the DMRS is associated with a Layer 1 signal to interference plus noise (L1-SINR) measurement procedure that includes a channel measurement (CM) procedure and an interference measurement (IM) procedure, and the IM is used for the SIM.

In a seventeenth aspect, alone or in combination with one or more of the first through sixteenth aspects, the DMRS is a first DMRS associated with a physical uplink control channel that carries an acknowledgment or negative acknowledgment, a second DMRS is associated with a physical downlink shared channel (PDSCH) associated with the acknowledgment or negative acknowledgment, the first DMRS is used for the SIM, and the second DMRS associated with the PDSCH associated with the acknowledgment or negative acknowledgment is used for the CM associated with the SIM in the L1-SINR measurement procedure.

In an eighteenth aspect, alone or in combination with one or more of the first through seventeenth aspects, the DMRS is used for the SIM, and the CM associated with the SIM is performed using a channel state information reference signal or a downlink DMRS associated with a physical downlink control or data channel, and the data transmission or the control transmission is associated with periodic traffic.

In a nineteenth aspect, alone or in combination with one or more of the first through eighteenth aspects, the DMRS is associated with a physical uplink shared channel, the DMRS associated with the physical uplink shared channel is used for the SIM, downlink control information that schedules the physical uplink shared channel schedules a CM resource corresponding to the DMRS, and the CM is performed using the scheduled CM resource.

In a twentieth aspect, alone or in combination with one or more of the first through nineteenth aspects, the data transmission or the control transmission is associated with a configured grant that indicates respective configurations for a plurality of periodic transmissions associated with a plurality of respective demodulation reference signals, and the SIM is based at least in part on the respective configurations.

In a twenty-first aspect, alone or in combination with one or more of the first through twentieth aspects, the SIM is based at least in part on a filtering technique associated with the plurality of periodic transmissions.

In a twenty-second aspect, alone or in combination with one or more of the first through twenty-first aspects, the data transmission or the control transmission is associated with a dynamic allocation, and the SIM comprises a SIM without filtering.

In a twenty-third aspect, alone or in combination with one or more of the first through twenty-second aspects, the data transmission or the control transmission is associated with a long control channel format that is configured for repetition across multiple slots, and the SIM uses multiple inter-panel receive beams corresponding to multiple repetitions of the data transmission or the control transmission.

In a twenty-fourth aspect, alone or in combination with one or more of the first through twenty-third aspects, the SIM is performed using a physical uplink control channel of the control transmission.

In a twenty-fifth aspect, alone or in combination with one or more of the first through twenty-fourth aspects, the SIM is performed using a physical uplink shared channel of the data transmission.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
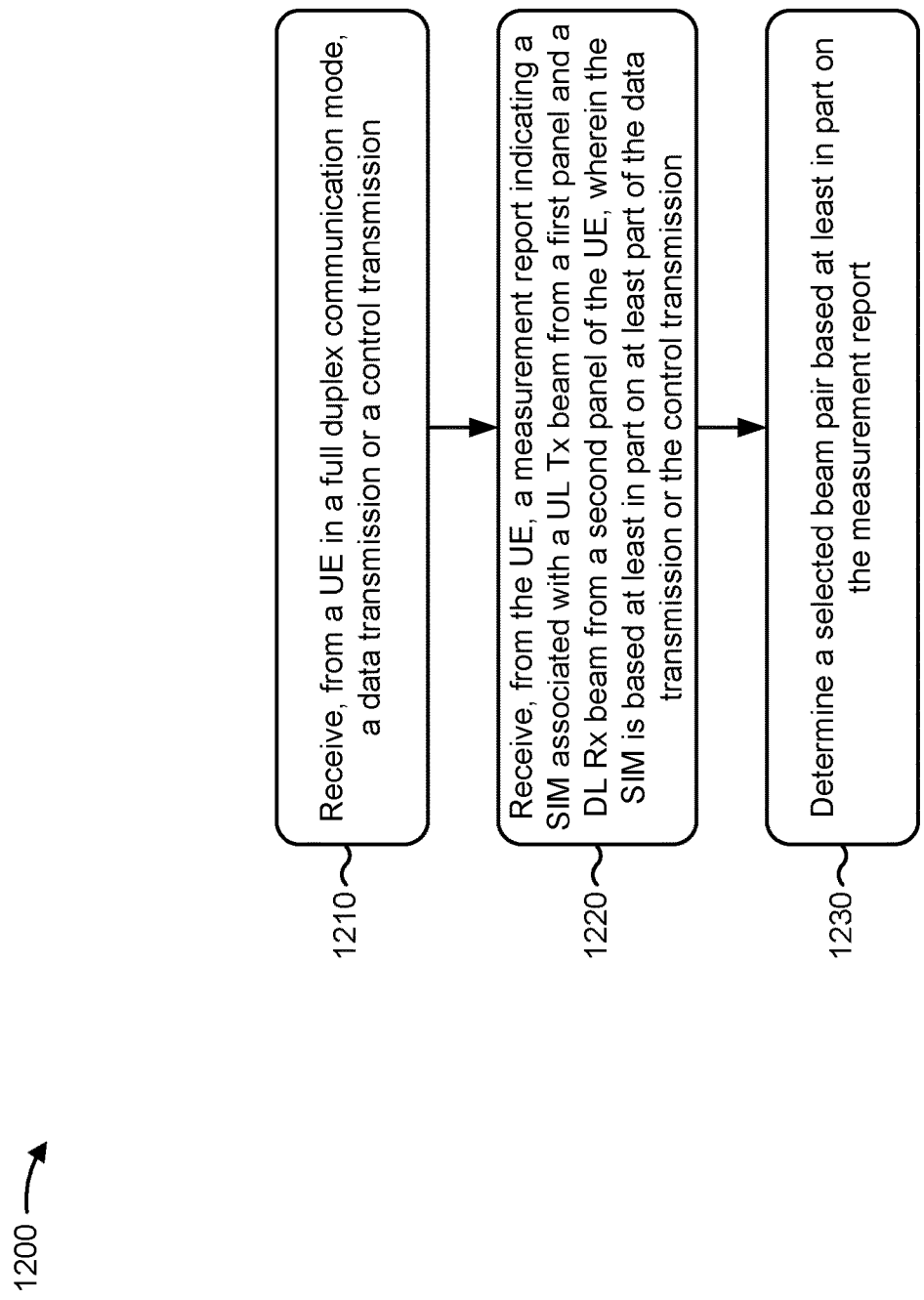
FIG. 12 is a diagram illustrating an example process performed, for example, by a base station, in accordance with the present disclosure.

FIG. 12 is a diagram illustrating an example process 1200 performed, for example, by a base station, in accordance with the present disclosure. Example process 1200 is an example where the base station (e.g., base station 110, and/or the like) performs operations associated with demodulation signal based self-interference measurement.

As shown in FIG. 12, in some aspects, process 1200 may include receiving, from a UE in a full duplex communication mode, a data transmission or a control transmission (block 1210). For example, the base station (e.g., using antenna 234, DEMOD 232, MIMO detector 236, receive processor 238, controller/processor 240, and/or the like) may receive, from a UE in a full duplex communication mode, a data transmission or a control transmission, as described above.

As further shown in FIG. 12, in some aspects, process 1200 may include receiving, from the UE, a measurement report indicating a SIM associated with a UL Tx beam from a first panel and a DL Rx beam from a second panel of the UE, wherein the SIM is based at least in part on at least part of the data transmission or the control transmission (block 1220). For example, the base station (e.g., using antenna 234, DEMOD 232, MIMO detector 236, receive processor 238, controller/processor 240, and/or the like) may receive, from the UE, a measurement report indicating a SIM associated with a UL Tx beam from a first panel and a DL Rx beam from a second panel of the UE, as described above. In some aspects, the SIM is based at least in part on at least part of the data transmission or the control transmission.

As further shown in FIG. 12, in some aspects, process 1200 may include determining a selected beam pair based at least in part on the measurement report (block 1230). For example, the base station (e.g., using controller/processor 240, transmit processor 220, TX MIMO processor 230, MOD 232, antenna 234, and/or the like) may communicate using a selected beam pair (e.g., a final DL/UL beam pair) based at least in part on the measurement report, as described above. In some aspects, the base station may signal the final DL/UL beam pair to the UE, as described elsewhere herein.

Process 1200 may include additional aspects, such as any single aspect or any combination of aspects described below and/or in connection with one or more other processes described elsewhere herein.

In a first aspect, the SIM is performed using a demodulation reference signal (DMRS) of the data transmission or the control transmission.

In a second aspect, alone or in combination with the first aspect, the DMRS is received using a same precoding or beam as the data transmission or the control transmission.

In a third aspect, alone or in combination with one or more of the first and second aspects, the DMRS is transmitted on the UL Tx beam, and process 1200 further comprises transmitting information indicating a quasi-colocation configuration for the DL Rx beam corresponding to the UL Tx beam associated with the SIM.

In a fourth aspect, alone or in combination with one or more of the first through third aspects, the information indicating the quasi-colocation configuration is transmitted in at least one of downlink control information or a measurement configuration for the demodulation reference signal.

In a fifth aspect, alone or in combination with one or more of the first through fourth aspects, the DMRS is associated with a configuration type associated with alternating sub-carrier mappings.

In a sixth aspect, alone or in combination with one or more of the first through fifth aspects, the DMRS is associated with a configuration type associated with contiguous subcarrier mappings.

In a seventh aspect, alone or in combination with one or more of the first through sixth aspects, the DMRS is associated with a shared channel type indicating that the DMRS is mapped to a third or fourth symbol of a slot.

In an eighth aspect, alone or in combination with one or more of the first through seventh aspects, the DMRS is associated with a shared channel type indicating that the DMRS is mapped to a first symbol of a slot.

In a ninth aspect, alone or in combination with one or more of the first through eighth aspects, the DMRS is associated with a plurality of DMRSs that are received at different symbols of one or more slots.

In a tenth aspect, alone or in combination with one or more of the first through ninth aspects, the data transmission or the control transmission is associated with a repetition scheme, receiving the data transmission or the control transmission comprises receiving multiple repetition configurations of the data transmission or the control transmission, and the DMRS is received using multiple different transmit beams based at least in part on the repetition scheme.

In an eleventh aspect, alone or in combination with one or more of the first through tenth aspects, in each repetition configuration of the multiple repetition configurations, a bandwidth of the DMRS is included in a downlink bandwidth part of the UE.

In a twelfth aspect, alone or in combination with one or more of the first through eleventh aspects, the DMRS is associated with a cross-link interference measurement procedure.

In a thirteenth aspect, alone or in combination with one or more of the first through twelfth aspects, the DMRS is associated with a Layer 1 signal to interference plus noise (L1-SINR) measurement procedure that includes a channel measurement (CM) procedure and an interference measurement (IM) procedure, and the IM is used for the SIM.

In a fourteenth aspect, alone or in combination with one or more of the first through thirteenth aspects, the DMRS is a first DMRS associated with a physical uplink control channel that carries an acknowledgment or negative acknowledgment, a second DMRS is associated with a physical downlink shared channel (PDSCH) associated with the acknowledgment or negative acknowledgment, the first DMRS is used for the SIM, and the second DMRS associated with the PDSCH associated with the acknowledgment or negative acknowledgment is used for the CM associated with the SIM in the L1-SINR measurement procedure.

In a fifteenth aspect, alone or in combination with one or more of the first through fourteenth aspects, the DMRS is used for the SIM, and the CM associated with the SIM is performed using a channel state information reference signal or a downlink DMRS associated with a physical downlink control or data channel, and the data transmission or the control transmission is associated with periodic traffic.

In a sixteenth aspect, alone or in combination with one or more of the first through fifteenth aspects, the DMRS is associated with a physical uplink shared channel, the DMRS associated with the physical uplink shared channel is used for the SIM, and process 1200 further comprises transmitting downlink control information that schedules a CM resource corresponding to the DMRS, the CM is performed using the scheduled CM resource.

In a seventeenth aspect, alone or in combination with one or more of the first through sixteenth aspects, the SIM is based at least in part on a physical uplink control channel of the control transmission.

In an eighteenth aspect, alone or in combination with one or more of the first through seventeenth aspects, the SIM is based at least in part on a physical uplink shared channel of the data transmission.

In a nineteenth aspect, alone or in combination with one or more of the first through eighteenth aspects, the data transmission or the control transmission is associated with a configured grant that indicates respective configurations for a plurality of periodic transmissions associated with a plurality of respective demodulation reference signals, and the SIM is based at least in part on the respective configurations.

In a twentieth aspect, alone or in combination with one or more of the first through nineteenth aspects, the SIM is based at least in part on a filtering technique associated with the plurality of periodic transmissions.

In a twenty-first aspect, alone or in combination with one or more of the first through twentieth aspects, the data transmission or the control transmission is associated with a dynamic allocation, and the SIM comprises a SIM without filtering.

In a twenty-second aspect, alone or in combination with one or more of the first through twenty-first aspects, the data transmission or the control transmission is associated with a long control channel format that is configured for repetition across multiple slots, and the SIM uses multiple inter-panel receive beams corresponding to multiple repetitions of the data transmission or the control transmission.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

The concepts and operations described herein as being used to determine SIM using a DMRS can also be applied for the purposes of determining SIM using a PUCCH, a PUSCH, and/or a similar data or control transmission of a UE or node.

The following provides an overview of some Aspects of the present disclosure:

Aspect 1: A method of wireless communication performed by a user equipment (UE), comprising: transmitting, in a full duplex communication mode, a data transmission or a control transmission; performing a self-interference measurement (SIM) associated with an uplink (UL) transmit (Tx) beam from a first panel and a downlink (DL) receive (Rx) beam from a second panel of the UE, based at least in part on at least part of the data transmission or the control transmission; and transmitting a measurement report indicating the SIM.

Aspect 2: The method of Aspect 1, wherein the SIM is performed using a demodulation reference signal (DMRS) of the data transmission or the control transmission.

Aspect 3: The method of Aspect 2, wherein the DMRS is transmitted using a same precoding or beam as the data transmission or the control transmission.

Aspect 4: The method of Aspect 2, wherein the DMRS is transmitted on the UL Tx beam, and wherein the method further comprises: receiving information indicating a quasi-colocation configuration for the DL Rx beam corresponding to the UL Tx beam associated with the SIM.

Aspect 5: The method of Aspect 4, wherein the information indicating the quasi-colocation configuration is received in at least one of downlink control information or a measurement configuration for the demodulation reference signal.

Aspect 6: The method of any of Aspects 2-5, wherein the DMRS is associated with a configuration type associated with alternating subcarrier mappings.

Aspect 7: The method of any of Aspects 2-6, wherein the DMRS is associated with a configuration type associated with contiguous subcarrier mappings.

Aspect 8: The method of any of Aspects 2-7, wherein the DMRS is associated with a shared channel type indicating that the DMRS is mapped to a third or fourth symbol of a slot.

Aspect 9: The method of any of Aspects 2-8, wherein the DMRS is associated with a shared channel type indicating that the DMRS is mapped to a first symbol of a slot.

Aspect 10: The method of any of Aspects 2-9, wherein the DMRS is one of a plurality of DMRSs that are transmitted at different symbols of one or more slots, wherein the plurality of DMRSs sweep through different receive beams of one or more panels of the UE other than a panel used to transmit the plurality of DMRSs on corresponding transmit beams.

Aspect 11: The method of any of Aspects 2-10, wherein the data transmission or the control transmission is associated with a repetition scheme, and wherein transmitting the data transmission or the control transmission comprises transmitting multiple repetition configurations of the data transmission or the control transmission, wherein the DMRS is transmitted using multiple different transmit beams based at least in part on the repetition scheme.

Aspect 12: The method of Aspect 11, wherein, in each repetition configuration of the multiple repetition configurations, the DMRS is received using multiple different receive beams based at least in part on the repetition scheme.

Aspect 13: The method of Aspect 11, wherein the repetition scheme is a slot-based repetition scheme.

Aspect 14: The method of Aspect 11, wherein the repetition scheme is a mini-slot-based repetition scheme.

Aspect 15: The method of any of Aspects 2-14, wherein the DMRS is an uplink DMRS, and wherein a bandwidth of the uplink DMRS is included in a downlink bandwidth part of the UE.

Aspect 16: The method of any of Aspects 2-15, wherein the DMRS is associated with a cross-link interference measurement, and wherein the method further comprises performing the cross-link interference measurement concurrently with the SIM.

Aspect 17: The method of any of Aspects 2-16, wherein the DMRS is associated with a Layer 1 signal to interference plus noise (L1-SINR) measurement that includes a channel measurement (CM) and an interference measurement (IM), and wherein the IM is used for the SIM.

Aspect 18: The method of Aspect 17, wherein the DMRS is a first DMRS associated with a physical uplink control channel that carries an acknowledgment or negative acknowledgment (ACK/NACK), wherein a second DMRS is associated with a physical downlink shared channel (PDSCH) associated with the ACK/NACK, wherein the first DMRS is used for the SIM, and wherein the second DMRS associated with the PDSCH associated with the ACK/NACK is used for the CM associated with the SIM in the L1-SINR measurement.

Aspect 19: The method of Aspect 17, wherein the DMRS is used for the SIM, and wherein the CM associated with the SIM is performed using a channel state information reference signal or a downlink DMRS associated with a physical downlink control or data channel, and wherein the data transmission or the control transmission is associated with periodic traffic.

Aspect 20: The method of Aspect 17, wherein the DMRS is associated with a physical uplink shared channel, wherein the DMRS associated with the physical uplink shared channel is used for the SIM, wherein downlink control information that schedules the physical uplink shared channel schedules a CM resource corresponding to the DMRS, and wherein the CM is performed using the scheduled CM resource.

Aspect 21: The method of any of Aspects 2-20, wherein the data transmission or the control transmission is associated with a configured grant that indicates respective configurations for a plurality of periodic transmissions associated with a plurality of respective demodulation reference signals, and wherein the SIM is based at least in part on the respective configurations.

Aspect 22: The method of Aspect 21, wherein the SIM is based at least in part on a filtering technique associated with the plurality of periodic transmissions.

Aspect 23: The method of any of Aspects 2-22, wherein the data transmission or the control transmission is associated with a dynamic allocation, and wherein the SIM comprises a SIM without filtering.

Aspect 24: The method of any of Aspects 2-23, wherein the data transmission or the control transmission is associated with a long control channel format that is configured for repetition across multiple slots, and wherein the SIM uses multiple inter-panel receive beams corresponding to multiple repetitions of the data transmission or the control transmission.

Aspect 25: The method of Aspect 1, wherein the SIM is performed using a physical uplink control channel of the control transmission.

Aspect 26: The method of Aspect 1, wherein the SIM is performed using a physical uplink shared channel of the data transmission.

Aspect 27: A method of wireless communication performed by a base station, comprising: receiving, from a user equipment (UE) in a full duplex communication mode, a data transmission or a control transmission; receiving, from the UE, a measurement report indicating a self-interference measurement (SIM) associated with an uplink (UL) transmit (Tx) beam from a first panel and a downlink (DL) receive (Rx) beam from a second panel of the UE, wherein the SIM is based at least in part on at least part of the data transmission or the control transmission; and determining a selected beam pair based at least in part on the measurement report.

Aspect 28: The method of Aspect 27, wherein the SIM is performed using a demodulation reference signal (DMRS) of the data transmission or the control transmission.

Aspect 29: The method of Aspect 28, wherein the DMRS is received using a same precoding or beam as the data transmission or the control transmission.

Aspect 30: The method of Aspect 29, wherein the DMRS is transmitted on the UL Tx beam, and wherein the method further comprises: transmitting information indicating a quasi-colocation configuration for the DL Rx beam corresponding to the UL Tx beam associated with the SIM.

Aspect 31: The method of Aspect 30, wherein the information indicating the quasi-colocation configuration is transmitted in at least one of downlink control information or a measurement configuration for the demodulation reference signal.

Aspect 32: The method of any of Aspects 28-31, wherein the DMRS is associated with a configuration type associated with alternating subcarrier mappings.

Aspect 33: The method of any of Aspects 28-32, wherein the DMRS is associated with a configuration type associated with contiguous subcarrier mappings.

Aspect 34: The method of any of Aspects 28-33, wherein the DMRS is associated with a shared channel type indicating that the DMRS is mapped to a third or fourth symbol of a slot.

Aspect 35: The method of any of Aspects 28-34, wherein the DMRS is associated with a shared channel type indicating that the DMRS is mapped to a first symbol of a slot.

Aspect 36: The method of any of Aspects 28-35, wherein the DMRS is associated with a plurality of DMRSs that are received at different symbols of one or more slots.

Aspect 37: The method of any of Aspects 28-36, wherein the data transmission or the control transmission is associated with a repetition scheme, wherein receiving the data transmission or the control transmission comprises receiving multiple repetition configurations of the data transmission or the control transmission, and wherein the DMRS is received using multiple different transmit beams based at least in part on the repetition scheme.

Aspect 38: The method of Aspect 37, wherein, in each repetition configuration of the multiple repetition configurations, a bandwidth of the DMRS is included in a downlink bandwidth part of the UE.

Aspect 39: The method of any of Aspects 28-38, wherein the DMRS is associated with a cross-link interference measurement.

Aspect 40: The method of any of Aspects 28-39, wherein the DMRS is associated with a Layer 1 signal to interference plus noise (L1-SINR) measurement procedure that includes a channel measurement (CM) procedure and an interference measurement (IM) procedure, and wherein the IM is used for the SIM.

Aspect 41: The method of Aspect 40, wherein the DMRS is a first DMRS associated with a physical uplink control channel that carries an acknowledgment or negative acknowledgment, wherein a second DMRS is associated with a physical downlink shared channel (PDSCH) associated with the acknowledgment or negative acknowledgment, wherein the first DMRS is used for the SIM, and wherein the second DMRS associated with the PDSCH associated with the acknowledgment or negative acknowledgment is used for the CM associated with the SIM in the L1-SINR measurement procedure.

Aspect 42: The method of Aspect 40, wherein the DMRS is used for the SIM, and wherein the CM associated with the SIM is performed using a channel state information reference signal or a downlink DMRS associated with a physical downlink control or data channel, and wherein the data transmission or the control transmission is associated with periodic traffic.

Aspect 43: The method of Aspect 40, wherein the DMRS is associated with a physical uplink shared channel, wherein the DMRS associated with the physical uplink shared channel is used for the SIM, and wherein the method further comprises: transmitting downlink control information that schedules a CM resource corresponding to the DMRS, wherein the CM is performed using the scheduled CM resource.

Aspect 44: The method of any of Aspects 28-43, wherein the SIM is based at least in part on a physical uplink control channel of the control transmission.

Aspect 45: The method of any of Aspects 28-44, wherein the SIM is based at least in part on a physical uplink shared channel of the data transmission.

Aspect 46: The method of any of Aspects 28-45, wherein the data transmission or the control transmission is associated with a configured grant that indicates respective configurations for a plurality of periodic transmissions associated with a plurality of respective demodulation reference signals, and wherein the SIM is based at least in part on the respective configurations.

Aspect 47: The method of Aspect 46, wherein the SIM is based at least in part on a filtering technique associated with the plurality of periodic transmissions.

Aspect 48: The method of Aspect 27, wherein the data transmission or the control transmission is associated with a dynamic allocation, and wherein the SIM comprises a SIM without filtering.

Aspect 49: The method of Aspect 27, wherein the data transmission or the control transmission is associated with a long control channel format that is configured for repetition across multiple slots, and wherein the SIM uses multiple inter-panel receive beams corresponding to multiple repetitions of the data transmission or the control transmission.

Aspect 50: An apparatus for wireless communication at a device, comprising a processor; memory coupled with the processor; and instructions stored in the memory and executable by the processor to cause the apparatus to perform the method of one or more Aspects of Aspects 1-49.

Aspect 51: A device for wireless communication, comprising a memory and one or more processors coupled to the memory, the memory and the one or more processors configured to perform the method of one or more Aspects of Aspects 1-49.

Aspect 52: An apparatus for wireless communication, comprising at least one means for performing the method of one or more Aspects of Aspects 1-49.

Aspect 53: A non-transitory computer-readable medium storing code for wireless communication, the code comprising instructions executable by a processor to perform the method of one or more Aspects of Aspects 1-49.

Aspect 54: A non-transitory computer-readable medium storing a set of instructions for wireless communication, the set of instructions comprising one or more instructions that, when executed by one or more processors of a device, cause the device to perform the method of one or more Aspects of Aspects 1-49.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
transmitting, in a full duplex communication mode, a data transmission or a control transmission to a base station using an uplink (UL) transmit (Tx) beam from a first panel of the UE, wherein the data transmission or control transmission comprises a demodulation reference signal (DMRS);
performing, based at least part on the DMRS of the data transmission or the control transmission, a self-interference measurement (SIM) associated with the uplink (UL) transmit (Tx) beam from the first panel and a downlink (DL) receive (Rx) beam from a second panel of the UE; and
transmitting, to the base station, a measurement report indicating the SIM.

2. The method of claim 1, wherein the DMRS is transmitted using a same precoding or beam as the data transmission or the control transmission.

3. The method of claim 1, wherein the method further comprises:
receiving information indicating a quasi-colocation configuration for the DL Rx beam corresponding to the UL Tx beam associated with the SIM.

4. The method of claim 3, wherein the information indicating the quasi-colocation configuration is received in at least one of downlink control information or a measurement configuration for the demodulation reference signal.

5. The method of claim 1, wherein the DMRS is associated with a configuration type associated with alternating subcarrier mappings.

6. The method of claim 1, wherein the DMRS is associated with a configuration type associated with contiguous subcarrier mappings.

7. The method of claim 1, wherein the DMRS is associated with a shared channel type indicating that the DMRS is mapped to a third or fourth symbol of a slot.

8. The method of claim 1, wherein the DMRS is associated with a shared channel type indicating that the DMRS is mapped to a first symbol of a slot.

9. The method of claim 1, wherein the DMRS is one of a plurality of DMRSs that are transmitted at different symbols of one or more slots, wherein the plurality of DMRSs sweep through different receive beams of one or more panels of the UE other than a panel used to transmit the plurality of DMRSs on corresponding transmit beams.

10. The method of claim 1, wherein the data transmission or the control transmission is associated with a repetition scheme, and wherein transmitting the data transmission or the control transmission comprises transmitting multiple repetition configurations of the data transmission or the control transmission, wherein the DMRS is transmitted using multiple different transmit beams based at least in part on the repetition scheme.

11. The method of claim 10, wherein, in each repetition configuration of the multiple repetition configurations, the DMRS is received using multiple different receive beams based at least in part on the repetition scheme.

12. The method of claim 1, wherein the DMRS is an uplink DMRS, and wherein a bandwidth of the uplink DMRS is included in a downlink bandwidth part of the UE.

13. The method of claim 1, wherein the DMRS is associated with a cross-link interference measurement, and wherein the method further comprises performing the cross-link interference measurement concurrently with the SIM.

14. The method of claim 1, wherein the DMRS is associated with a Layer 1 signal to interference plus noise (L1-SINR) measurement that includes a channel measurement (CM) and an interference measurement (IM), and wherein the IM is used for the SIM.

15. The method of claim 14, wherein the DMRS is a first DMRS associated with a physical uplink control channel that carries an acknowledgment or negative acknowledgment (ACK/NACK), wherein a second DMRS is associated with a physical downlink shared channel (PDSCH) associated with the ACK/NACK, wherein the first DMRS is used for the SIM, and wherein the second DMRS associated with the PDSCH associated with the ACK/NACK is used for the CM associated with the SIM in the L1-SINR measurement.

16. The method of claim 14, wherein the DMRS is used for the SIM, and wherein the CM associated with the SIM is performed using a channel state information reference signal or a downlink DMRS associated with a physical downlink control or data channel, and wherein the data transmission or the control transmission is associated with periodic traffic.

17. The method of claim 14, wherein the DMRS is associated with a physical uplink shared channel, wherein the DMRS associated with the physical uplink shared channel is used for the SIM, wherein downlink control information that schedules the physical uplink shared channel schedules a CM resource corresponding to the DMRS, and wherein the CM is performed using the scheduled CM resource.

18. The method of claim 1, wherein the data transmission or the control transmission is associated with a configured grant that indicates respective configurations for a plurality of periodic transmissions associated with a plurality of respective demodulation reference signals, and wherein the SIM is based at least in part on the respective configurations.

19. The method of claim 18, wherein the SIM is based at least in part on a filtering technique associated with the plurality of periodic transmissions.

20. The method of claim 1, wherein the data transmission or the control transmission is associated with a dynamic allocation, and wherein the SIM comprises a SIM without filtering.

21. The method of claim 1, wherein the data transmission or the control transmission is associated with a long control channel format that is configured for repetition across multiple slots, and wherein the SIM uses multiple inter-panel receive beams corresponding to multiple repetitions of the data transmission or the control transmission.

22. The method of claim 1, wherein the SIM is performed using a physical uplink control channel of the control transmission.

23. The method of claim 1, wherein the SIM is performed using a physical uplink shared channel of the data transmission.

24. A method of wireless communication performed by a base station, comprising:
receiving, from a user equipment (UE) in a full duplex communication mode, via an uplink (UL) transmit (Tx) beam from a first panel of the UE a data transmission or a control transmission, wherein the data transmission or control transmission comprises a demodulation reference signal (DMRS);
receiving, from the UE, a measurement report indicating a self-interference measurement (SIM) associated with the uplink (UL) transmit (Tx) beam from the first panel and a downlink (DL) receive (Rx) beam from a second panel of the UE, wherein the SIM is based at least in part on the DMRS of the data transmission or the control transmission; and communicating using a selected beam pair based at least in part on the measurement report.

25. The method of claim 24, wherein the data transmission or the control transmission is associated with a dynamic allocation, and wherein the SIM comprises a SIM without filtering.

26. The method of claim 24, wherein the data transmission or the control transmission is associated with a long control channel format that is configured for repetition across multiple slots, and wherein the SIM uses multiple inter-panel receive beams corresponding to multiple repetitions of the data transmission or the control transmission.

27. The method of claim 24, wherein the DMRS is associated with a Layer 1 signal to interference plus noise (L1-SINR) measurement that includes a channel measurement (CM) and an interference measurement (IM), and wherein the IM is used for the SIM.

28. The method of claim 27, wherein the DMRS is a first DMRS associated with a physical uplink control channel that carries an acknowledgment or negative acknowledgment (ACK/NACK), wherein a second DMRS is associated with a physical downlink shared channel (PDSCH) associated with the ACK/NACK, wherein the first DMRS is used for the SIM, and wherein the second DMRS associated with the PDSCH associated with the ACK/NACK is used for the CM associated with the SIM in the L1-SINR measurement.

29. A user equipment (UE) for wireless communication, comprising:
one or more memories; and
one or more processors coupled to the one or more memories, the one or more memories and the one or more processors configured to:
transmit, in a full duplex communication mode, a data transmission or a control transmission to a base station using an uplink (UL) transmit (Tx) beam from a first panel of the UE, wherein the data transmission or control transmission comprises a demodulation reference signal (DMRS);
perform, based at least part on the DMRS of the data transmission or the control transmission, a self-interference measurement (SIM) associated with the uplink (UL) transmit (Tx) beam from the first panel and a downlink (DL) receive (Rx) beam from a second panel of the UE; and
transmit, to the base station, a measurement report indicating the SIM.

30. A base station for wireless communication, comprising:
one or more memories; and
one or more processors coupled to the one or more memories, the one or more memories and the one or more processors configured to:
receive, from a user equipment (UE) in a full duplex communication mode, via an uplink (UL) transmit (Tx) beam from a first panel of the UE a data transmission or a control transmission, wherein the data transmission or control transmission comprises a demodulation reference signal (DMRS);
receive, from the UE, a measurement report indicating a self-interference measurement (SIM) associated with the uplink (UL) transmit (Tx) beam from the first panel and a downlink (DL) receive (Rx) beam from a second panel of the UE, wherein the SIM is based at least in part on the DMRS of the data transmission or the control transmission; and
communicate using a selected beam pair based at least in part on the measurement report.

* * * * *